US008896579B2

(12) United States Patent
DiVerdi

(10) Patent No.: US 8,896,579 B2
(45) Date of Patent: *Nov. 25, 2014

(54) METHODS AND APPARATUS FOR DEFORMATION OF VIRTUAL BRUSH MARKS VIA TEXTURE PROJECTION

(75) Inventor: Stephen J. DiVerdi, Oakland, CA (US)

(73) Assignee: Adobe Systems Incorporated, San Jose, CA (US)

(*) Notice: Subject to any disclaimer, the term of this patent is extended or adjusted under 35 U.S.C. 154(b) by 51 days.

This patent is subject to a terminal disclaimer.

(21) Appl. No.: 13/562,635

(22) Filed: Jul. 31, 2012

(65) Prior Publication Data

US 2013/0229390 A1 Sep. 5, 2013

Related U.S. Application Data

(60) Provisional application No. 61/606,189, filed on Mar. 2, 2012.

(51) Int. Cl.
*G06F 3/033* (2013.01)

(52) U.S. Cl.
USPC ........................................ 345/179; 178/19.01

(58) Field of Classification Search
CPC . G06F 3/033; G06F 3/03542; G06F 3/03545; G06F 17/50; G06F 3/048; G06F 3/0484; G06F 3/0488; G06F 3/04883; G06F 3/0346; G06F 3/0386; G06T 11/001; G06T 11/003; G06T 11/20
USPC .............................. 345/179; 178/19.01–19.06
See application file for complete search history.

(56) References Cited

U.S. PATENT DOCUMENTS

| 5,592,597 | A | 1/1997 | Kiss | |
|---|---|---|---|---|
| 8,854,342 | | 10/2014 | Diverdi | |
| 2010/0181121 | A1* | 7/2010 | Tremblay | 178/19.01 |
| 2011/0251829 | A1 | 10/2011 | Baxter, III et al. | |
| 2013/0229389 | A1 | 9/2013 | DiVerdi | |
| 2013/0229391 | A1* | 9/2013 | DiVerdi | 345/179 |

OTHER PUBLICATIONS

Stephen DiVerdi, Aravind Krishnaswamy, and Sunil Hadap. Industrial-strength painting with a virtual bristle brush. In Proceedings of the 17th Symposium on Virtual Reality Software and Technology, Hong Kong, Nov. 22-24, 2010, pp. 119-126.
Robert Lansdale. Texture mapping and resampling for computer graphics. Master's thesis, University of Toronto, 1991. pp. 1-177.

(Continued)

*Primary Examiner* — Stephen Sherman
(74) *Attorney, Agent, or Firm* — Wolfe-SBMC

(57) ABSTRACT

A graphics application for simulating natural media drawing and painting may model a tablet stylus as if it were a virtual projector, and as if a 2D brush tip image were projected on a virtual canvas. The application may compute a texture projection based on the values of configurable parameters of the application and/or 6DOF data collected from the tablet stylus and/or the tablet. This texture projection (i.e., the mark resulting from deformation of the 2D brush tip image due to the stylus pose) may be used as a 2D stamp to create a mark on the virtual canvas in response to contact between the stylus and tablet. This may create a more natural mapping between tablet stylus poses and the resulting marks for artists accustomed to the behavior of pencils, felt tip pens, airbrushes, or another natural media, compared to those employed in previous digital painting applications.

20 Claims, 13 Drawing Sheets

(56) References Cited

OTHER PUBLICATIONS

Lance Williams. Pyramidal parametrics. In Computer Graphics, vol. 17, No. 3, pp. 1-11. Proceedings of SIGGRAPH '83. 1983.

Rudolf, D., Mould, D. and Neufeld, E. (Mar. 2005), A Bidirectional Deposition Model of Wax Crayons. Computer Graphics Forum, vol. 24, issue 1: pp. 27-39.

U.S. Appl. No. 13/625,331, filed Sep. 24, 2012, Stephen J. Diverdi.

Jonathan Konieczny and Gary Meyer. Airbrush simulation for artwork and computer modeling. In Proceedings of the 7th International Symposium on Non-Photorealistic Animation and Rendering, New Orleans, Aug. 1-9, 2009. pp. 61-69.

U.S. Appl. No. 13/562,635, filed Jul. 31, 2012, 61 pages.

Baxter, William "Simple Data-Driven Modeling of Brushes", *Proceedings of the 2010 ACM SIGGRAPH symposium on Interactive 3D Graphics and Games (I 3D 201 0), Association for Computing Machinery, Inc.*, (Feb. 2010), 8 pages.

Chu, Nelson et al., "Detail-Preserving Paint Modeling for 3D Brushes", *Proceedings of the 8th International Symposium on Non-Photorealistic Animation and Rendering (NPAR 201 0), Association for Computing Machinery. Inc.*, (Jun. 7, 2010), 8 pages.

Rudolf, Dave et al., "A Bidirectional Deposition Model of Wax Crayons", *Computer Graphics Forum*, vol. 24, issue 1, (Mar. 2005), 13 pages.

Rudolf, Dave et al., "Simulating Wax Crayons", *Proceedings of the 11th Pacific Conference on Computer Graphics and Applications, PG '03*, (2003),10 pages.

Van Haevre, William et al., "From Dust till Drawn: A Real-time Bidirectional Pastel Simulation", *The Visual Computer*, vol. 23 (Nos. 9-11), (2007), 8 pages.

"Notice of Allowance", U.S. Appl. No. 13/625,331, Jun. 23, 2014, 4 pages.

"Non-Final Office Action", U.S. Appl. No. 13/485,535, Jun. 13, 2014, 6 pages.

"Non-Final Office Action", U.S. Appl. No. 13/625,331, May 28, 2014, 8 pages.

\* cited by examiner

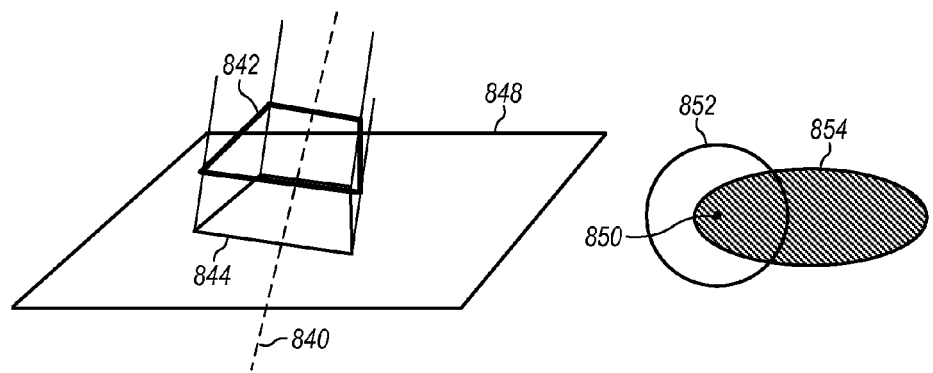
FIG. 8E
FIG. 8F
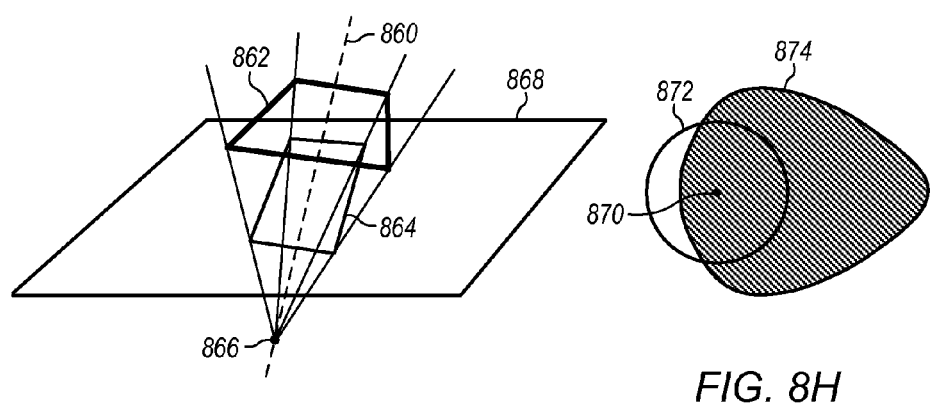
FIG. 8G
FIG. 8H

METHODS AND APPARATUS FOR DEFORMATION OF VIRTUAL BRUSH MARKS VIA TEXTURE PROJECTION

This application claims benefit of priority of U.S. Provisional Application Ser. No. 61/606,189 entitled "Methods and Apparatus for Deformation of Virtual Brush Marks via Texture Projection" filed Mar. 2, 2012, the content of which is incorporated by reference herein in its entirety.

BACKGROUND

Description of the Related Art

Digital images may include raster graphics, vector graphics, or a combination thereof. Raster graphics data (also referred to as bitmaps) may be stored and manipulated as a grid of individual picture elements called pixels. A bitmap may be characterized by its width and height in pixels and also by the number of bits per pixel. Commonly, a color bitmap defined in the RGB (red, green blue) color space may comprise between one and eight bits per pixel for each of the red, green, and blue channels. An alpha channel may be used to store additional data such as per-pixel transparency values. Vector graphics data may be stored and manipulated as one or more geometric objects built with geometric primitives. The geometric primitives (e.g., points, lines, polygons, Bézier curves, and text characters) may be based upon mathematical equations to represent parts of digital images.

Digital image processing is the process of analyzing and/or modifying digital images using a computing device, e.g., a computer system. Using specialized software programs, digital images may be manipulated and transformed in a variety of ways. For example, digital images may be created and/or modified using natural media drawing and/or painting simulation. Natural media drawing and/or painting simulation refers to digital, computer-based creation techniques for creating digital drawings, digital paintings, or other digital works that attempt to mimic real-world techniques and results for drawing (e.g., using a pencil and canvas) and/or painting (e.g., using a brush, palette, and canvas).

A real pencil makes different marks based on how the pencil is held, by nature of the contact between the pencil lead cone and the canvas surface. The mark variation intuitively makes sense to artists accustomed to working with such media. Some current digital painting applications allow users to make explicit one-to-one mappings between tablet inputs (e.g., pressure or tilt) and brush parameters (e.g., size or roundness). However, brush models based on these explicit mappings do not produce marks that exhibit the same variations as a real pencil.

SUMMARY

Various embodiments of methods and apparatus for natural media drawing and/or painting are described. Some embodiments may provide methods for performing various digital painting and/or drawing tasks using a natural, pose-based approach via a tablet type device and a stylus. Some embodiments may provide detection of stylus poses and/or gestures that mimic the real-world actions of artists in real (as opposed to digital) drawing and painting, and may perform appropriate digital painting and drawing actions in response to detecting the stylus poses and/or gestures. By supporting the use of stylus poses and gestures that mimic those used in real-world actions, the system may lower the cognitive load of the user and allow the user to focus on creativity as opposed to the workings of and user interfaces provided by conventional graphics applications. Some embodiments may enable posed-based and/or gesture-based natural media drawing and painting workflows by providing a set of six degrees of freedom (6DOF) stylus-based gestures for use with stylus and tablet input technologies, which may be augmented with additional hardware, and by mapping these stylus gestures and stylus poses to drawing and painting tasks in a natural media model.

Using a stylus, tablet, and software such as a tablet/stylus input module of a graphics application, embodiments may collect data from the stylus and/or tablet in response to user manipulation of the stylus and/or tablet to, for example, perform various user manipulation tracking tasks including but not limited to acceleration, position, orientation, and proximity detection for the stylus, and touch and pressure detection for the tablet. The collected data may be used to recognize various stylus poses and/or gestures in real-time or near-real time; the recognized stylus poses and/or gestures may be mapped to appropriate real-world drawing and painting actions that are then simulated in the graphics application as described herein. For example, stylus gestures that may be detected in embodiments may include, but are not limited to: translations in one or more dimensions, rotations, fanning motions, a mashing down motion, a jerking up motion, a jerking down motion, shaking the stylus away from the tablet, or shaking the stylus toward the tablet. The stylus poses and/or gestures and their mapping to natural media painting actions as provided by various embodiments of the systems and methods described herein may provide advantages over conventional widget-based user interfaces for natural media drawing and painting for at least the reason that the stylus gestures and their applications in natural media painting may reduce the cognitive load of the user for those tasks, since the gestures are aligned with pre-existing motor skills cultivated by traditional drawing and painting techniques, and since the gestures can be executed in-place with the artwork, which alleviates the need to shift focus away from the art to manipulate widgets.

In some embodiments, in order to create a more natural mapping of tablet stylus poses to two-dimensional (2D) brush tip deformation, a graphics application or image editing application (e.g., a natural media painting application) may use a 3D texture projection model, such as a custom projection model or one based on the existing 3D graphics literature. The application may be configured to model a tablet stylus as if it were a virtual projector, and as if a 2D brush tip image were projected from the tip of the stylus onto a virtual canvas. In some embodiments, the application may be configured to compute a texture projection (i.e., an image that would appear on the canvas), based on the values of various configurable parameters of the application and/or 6DOF data collected from the tablet stylus or the tablet itself. For example, the application may support a user-configurable perspective distortion parameter that controls the amount of distortion in the resulting mark. The texture projection (i.e., the mark resulting from deformation of the 2D brush tip image due to a particular stylus pose) may be used as a 2D stamp to create one or more marks on the virtual canvas (e.g., a brush stroke or a portion thereof) in response to contact between the stylus and tablet.

In some embodiments, the techniques described herein may create a more natural mapping between tablet stylus poses and the resulting marks for artists accustomed to the behavior of pencils, felt tip pens, airbrushes, or another natural media, compared to those employed in previous digital painting applications. For example, to create different artistic effects during the creation of a given brush stroke, a user may change the orientation of the stylus, may change the tilt of the stylus, or may twist or rotate the stylus while moving the stylus across the tablet, and the application may be configured to project different 2D stamps along the path of the brush stroke based on the changing pose and/or position data collected from the stylus and/or tablet.

BRIEF DESCRIPTION OF THE DRAWINGS

FIGS. 8A-8H illustrate how changing projection parameters results in different distortions, according to some embodiments.

Figure 1:
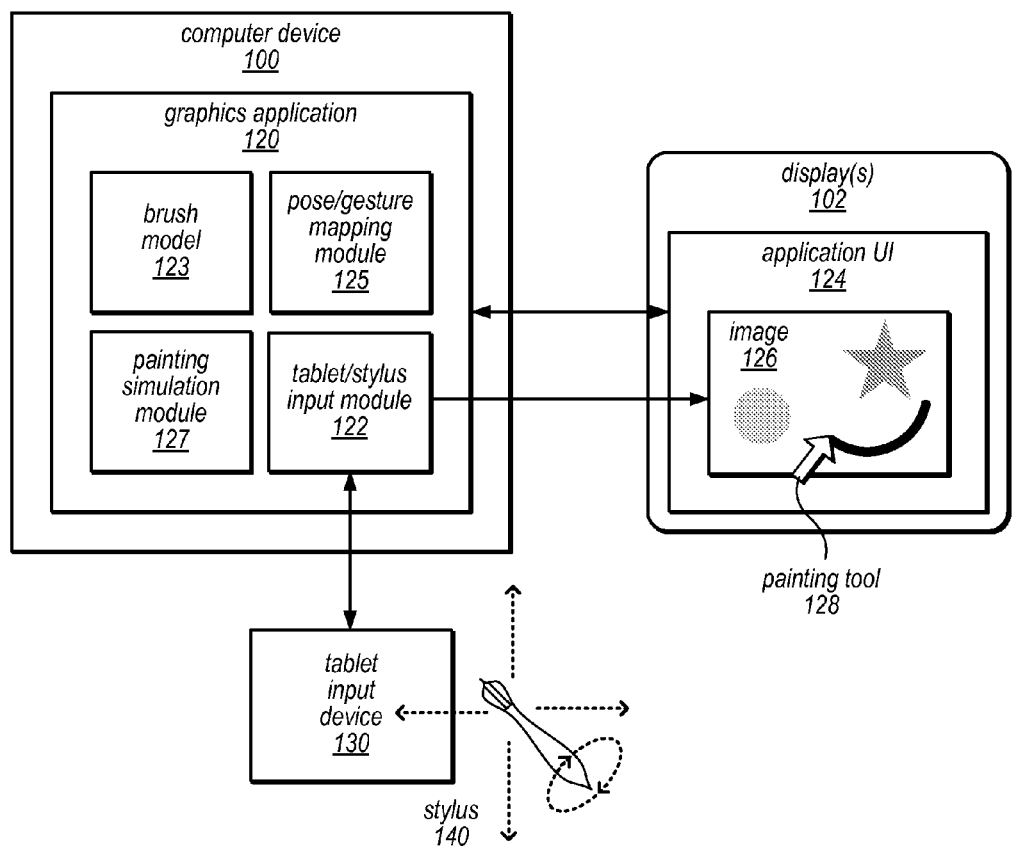
FIG. 1 is a block diagram illustrating one embodiment of a computer device that implements a natural media drawing and painting application employing a tablet and a stylus device, as described herein.

While various embodiments are described herein by way of example for several embodiments and illustrative drawings, those skilled in the art will recognize that embodiments are not limited to the embodiments or drawings described. It should be understood, that the drawings and detailed description thereto are not intended to limit the embodiments to the particular form disclosed, but on the contrary, the intention is to cover all modifications, equivalents and alternatives falling within the spirit and scope of the disclosure. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Various embodiments of methods and apparatus for using texture projection to model the deformation of virtual brush marks are described. Various embodiments may provide methods for performing various digital painting and drawing tasks using a natural, posed-based and/or gesture-based approach via a tablet, stylus, and software such as the tablet/stylus input module of the graphics application described herein. Some embodiments may provide detection of stylus gestures that mimic the real-world actions of artists in real (as opposed to digital) painting and drawing and stylus poses that mimic the way in which real-world artists create different effects by manipulating the pose (e.g., the orientation, position, and/or tilt) of a brush, pencil, oil pastel, charcoal, crayon, airbrush, or other natural media vehicle, and may perform appropriate digital painting and drawing actions and/or produce appropriate painting and drawing effects in response to detecting the stylus poses and/or gestures. This may in some embodiments lower the cognitive load of the user, and may allow the user to focus on creativity as opposed to the workings of and user interfaces provided by conventional graphics applications. Various embodiments may enable gesture-based natural media painting workflows by providing a set of six degrees of freedom (6DOF) stylus-based gestures and poses for use with a stylus and tablet input technologies, which may be augmented with additional hardware, and by mapping these stylus gestures and poses to painting tasks and effects in a natural media model.

In some embodiments, a graphics application that mimics natural media painting and/or drawing tasks using a brush model that deposits a 2D stamp on a virtual canvas may be configured to change the shape of the 2D stamp based on how the stylus is handled during a virtual brush stroke (e.g., the pose and/or position of the stylus with respect to the canvas, the pressure exerted on the tablet by the stylus, etc.). This may allow the application to more closely model the behavior of a real-world pencil, a felt tip pen, an airbrush, or another natural media painting/drawing tool that produces different types of marks depending on how it is handled. For example, when a conical tip on a brush or pencil comes in contact with a canvas, this may deform the tip, and the amount and/or portion of the tip that touches the canvas (and that leaves a mark) may change in various ways depending on the orientation, rotation, and/or position of the brush or pencil. In some embodiments, if a graphics application models a brush stroke using a stamp (e.g., a circular stamp), a change in the pressure with which the stylus contacts the tablet may change the size of the mark made by the stamp. In some embodiments, if the stylus is modeling a brush tool such as a pencil, a felt tip pen, or an airbrush, the shape of the mark made by the stamp may also change (e.g., it may not be circular) based on the pose of the stylus. In other words, changing the pose of the stylus may change the shape of the "tip" of the brush tool and, thus, the shape of the mark produced when the tip of the stylus comes into contact with (or in close proximity to) the tablet.

In some embodiments, a graphics application may map various pose parameters to the stylus tip shape. For example, the pressure applied by the stylus may be mapped to the stamp size, the tilt of the stylus may be mapped to the "roundness" of the stamp, and/or the rotation of the stylus may be mapped to the angle at which the stamp mark is created on the virtual canvas. In some embodiments, a virtual brush tool may be modeled as if it had a projector at the tip of the stylus that projects a stamp (e.g., a circle or other geometric shape, a pattern, an image, or any type of mark or texture). In such embodiments, when the stylus tilts, the virtual brush projector may "tilt" and distort the stamp based on the angle of the tilt and/or other pose parameters.

Using a stylus, tablet, and software such as a tablet/stylus input module of a graphics application, such as that illustrated in FIG. 1, some embodiments may collect data from the stylus and/or tablet in response to user manipulation of the stylus and/or tablet to perform various user manipulation tracking tasks. The collected data may include, but is not limited to, acceleration, position, orientation, and proximity data detected for or by the stylus, and touch and pressure data detected for or by the tablet. The collected data may be used to recognize various stylus poses and/or gestures in real-time or near-real time, and the recognized stylus poses and/or gestures may be mapped to appropriate real-world painting and drawing actions that are then simulated in the graphics application as described below.

FIG. 1 illustrates an example graphics workstation or other computing device that is configured to implement the systems and methods described herein, according to various embodiments. As illustrated in this example, the workstation may include, but is not limited to, a computer device 100, one or more displays 102, a tablet input device 130, and a stylus 140. An example computer device which may be used in some embodiments is further illustrated in FIG. 13. As illustrated in this example, computer device 100 may implement a graphics application 120, which may be a natural media painting application, as described herein. Graphics application 120 may include a brush model 123, a painting simulation module 127, a tablet/stylus input module 122, and/or a pose/gesture mapping module 125. In some embodiments, brush model 123 may be a component of painting simulation module 127.

Graphics application 120 may provide a user interface (UI) 124, which may be presented to a user via one or more displays 102. Graphics application 120 may display, for example in a window provided by the UI 124 on the one or more displays 102, an image 126 that a user is currently working on (e.g., either creating or editing). Graphics application 120 may provide a painting or drawing tool 128 that the user may manipulate, for example via tablet 130 and/or stylus 140, to create or edit content in image 126. The tool 128 may, for example, have various modes that emulate a paintbrush, pencil, charcoal, crayon, oil pastel, eraser, airbrush, spray can, and so on. While embodiments are generally described as providing gesture-based manipulations of a paintbrush tool, it is to be noted that similar techniques may be applied to other types of painting or drawing tools.

Stylus 140 may be configured to be held in a hand of the user and to be manipulated by the user in relation to tablet 130 to perform various image editing operations or other tasks. The user may manipulate stylus 140 and/or tablet 130 in various ways. For example the user may move stylus 140 away from tablet 130 or towards tablet 130; move stylus 140 up and down, left and right, or diagonally and so on in relation to tablet 130; rotate stylus 140 on one or more axes; touch a touch and/or pressure sensitive surface of tablet 130 with stylus 140 and/or with a finger, knuckle, fingernail, etc.; apply varying amounts of pressure to the touch and pressure sensitive surface of tablet 130 with a finger or stylus 140; move the tip of stylus 140 on the touch and pressure sensitive surface of tablet 130; and so on. Tablet 130 is configured to detect the various manipulations performed by the user with stylus 140 and/or with a finger, knuckle, etc. on the surface of tablet 130 and communicate information regarding the manipulations to tablet/stylus input module 122 on computer device 100, for example via a wired or wireless interface.

Tablet/stylus input module 122 may be implemented as a component or module of application 120, as a library function, as a driver, or as some other software entity. Tablet/stylus input module 122 may be implemented in software, in hardware, or as a combination of hardware and software. Graphics application 120, via tablet/stylus input module 122, may interpret the information regarding the manipulations to detect various gestures and to perform various painting actions in response to the detected gestures for creating or editing content of image 126. For at least some of those actions, painting tool 128 may be appropriately moved, modified, and/or otherwise affected on display 102. Various examples of gestures that may be detected are listed below, as are various examples of painting actions that may be invoked and/or controlled by such stylus gestures.

In some embodiments, software and/or hardware on tablet 130 may perform at least some of the functionality of detecting various gestures. Thus, in some embodiments, tablet 130 may be configured to detect gestures and communicate the detected gestures to graphics application 120, which then performs the appropriate painting actions in response to the gestures. In other embodiments, tablet 130 may only collect information regarding gestures and communicate the gestures to application 120 via tablet/stylus input module 122; tablet/stylus input module 122 may perform the function of detecting the gestures from the information and communicating the gestures to application 120, or to other modules of application 120, which then performs the appropriate painting actions in response to the gestures.

In various embodiments, graphics application 120 may include a bristle-based brush model 123, in which the brush consists of a set of bristles that dynamically change shape in response to the physics of the brush stroke (causing a change in the mark left by the brush). In contrast, a single (statically shaped) two-dimensional (2D) grayscale stamp is typically used by conventional digital painting programs.

In some embodiments, graphics application 120 (e.g., in the painting simulation module 127) may include support for "wet" and/or "dirty" paint, i.e., support for bidirectional paint transfer (e.g., from the brush to the canvas, and from the canvas to the brush), which enables color blending and smudging in a way that mimics natural paint media. Such bidirectional paint transfer is in contrast to a unidirectional paint transfer (e.g., the transfer of paint from brush to canvas only, without dirtying the brush) that is typically used in conventional digital painting programs.

In some embodiments, graphics application 120 (e.g., in the painting simulation module 127) may simulate watercolor painting, and create the effects of a brush wet with watery paint that slowly dries during a stroke. Conventional paint programs typically do not simulate these secondary effects, although some may use additional tools and textures to create similar results.

Figure 2:
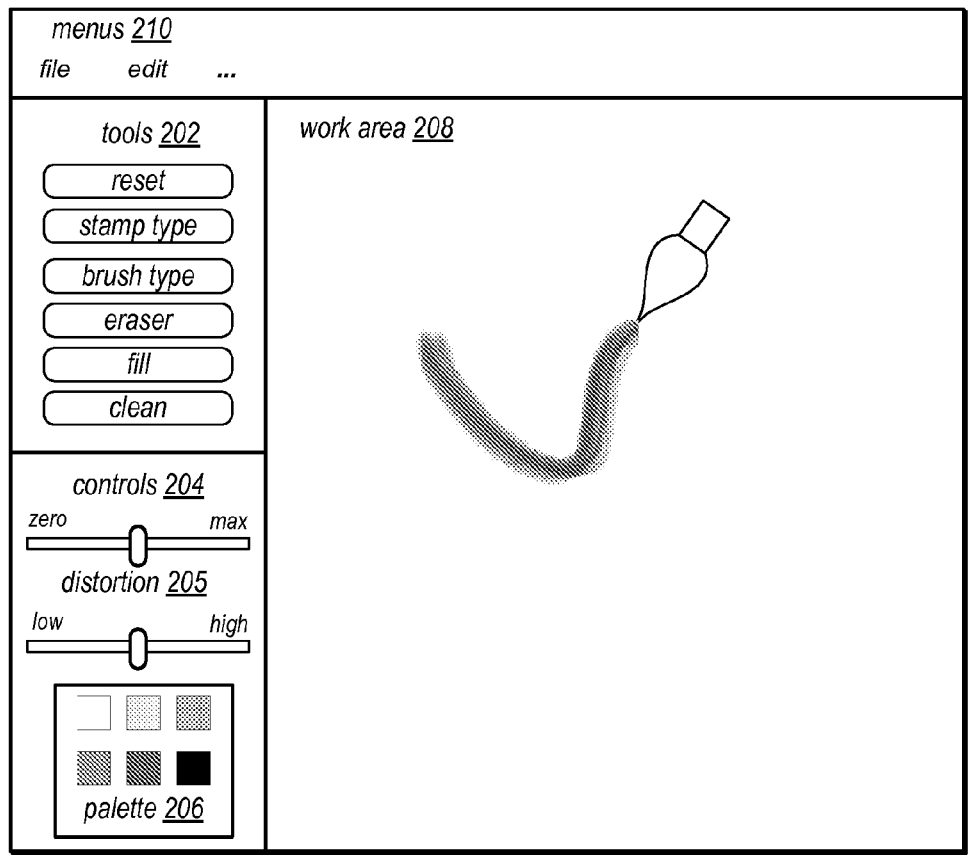
FIG. 2 is a block diagram illustrating a display on which a user interface to a graphics application may be implemented, according to some embodiments.

FIG. 2 illustrates an example display 200 on which a user interface to a graphics editing module, such as image editing operations module of graphics application 120 may be implemented, according to one embodiment. In this example, the display is divided into four regions or areas: menus 210, tools 202 (which may include a "fill" tool, a "clean" tool, a stamp type selection tool and/or a brush type selection tool), controls 204 (which may include palette 206 and distortion parameter selection tool 205), and work area 208. Tools 202 may include one or more user-selectable user interface elements. In this example, it is this area that contains the user interface elements that a user may select to apply various effects to the image. For example, the user may select a type of stamp (using the stamp type selection tool) or brush tool (using the brush type selection tool) for use in applying paint to an image being created and/or edited in work area 208. Other optional tools may be selected as well, such as an eraser or reset function, in some embodiments.

While FIG. 2 shows many of the elements in tools area 202 as buttons, other types of user interface elements, such as pop-up or pull-down menus, may be used to select from among one or more tools in various embodiments. For example, in one embodiment, the brush type selection mechanism illustrated in tools area 202 may be implemented using a pop-up or pull-down menu to select a brush type, such as a paintbrush, pencil, charcoal, crayon, felt tip pen, oil pastel, eraser, airbrush, spray can, and so on. In some embodiments, one or more of the available selections may be implemented as a 2D brush stamp, or the menu options may explicitly include a "2D stamp" type brush tool. In some embodiments, the stamp type selection mechanism illustrated in tools area 202 may be implemented using a pop-up or pull-down menu to select a 2D shape, image, pattern, texture, or other type of mark to be used as a stamp when creating various brush strokes, as described herein. As noted above, the reset and eraser tools are optional, and thus may or may not be included on the user interface in various embodiments. Various embodiments may include other tools not shown as well, such as an "undo" tool that undoes the most recent user action in the work area 208.

In this example, controls 204 may include one or more user-modifiable controls, such as slider bars, dials, pop-up menus, alphanumeric text entry boxes, etc., for specifying various parameters of the painting functions to be applied to an image (e.g., using the brush tool). In this example, two slider bars are provided to specify different values (or relative values) of configurable parameters of a painting function, one of which is usable to specify a distortion amount (205), i.e., a value for a perspective distortion parameter, as described herein. In various embodiments, slider bars may also be used to specify an amount of ink, a pigment concentration amount, a transparency value, a brush width, a bristle stiffness, a "hardness" parameter (e.g., for a pencil or other erodible mark making tool) or other parameters that are to be applied when using the brush tool to "paint" or "draw" on the image being created or edited in work area 208. Various methods of specifying values of any of the other parameters used in simulating painting effects (i.e., methods other than those illustrated in FIG. 2) may be used in other embodiments. In some embodiments, slider bars or another input mechanism in controls area 204 may be used to specify one or more threshold distance values for use with proximity based gestures and their corresponding functions in the graphics application, or a deposition threshold amount. In some embodiments, slider bars or another input mechanism in controls area 204 may be used to specify a zoom level for an automated zoom function or to override a default zoom level for such a function.

In the example illustrated in FIG. 2, menus 206 may include one or more menus, for example menus used to navigate to other displays in the graphics application, open files, print or save files, undo/redo actions, and so on. In this example, work area 208 is the area in which an image being created or edited is displayed as graphics editing operations are performed. In various embodiments, work area 208 may display a portion or all of a new image to which paint or other natural media is to be added, or a portion or all of a previously existing image being modified by adding paint, as described herein. In the example illustrated in FIG. 2, work area 208 of FIG. 2 illustrates an image in progress.

Some embodiments of a painting simulation module, such as painting simulation module 127 described herein, may employ a brush model (such as brush module 123) that simulates a brush tip and the notion of the paint being held in the brush tip and deposited on a canvas during strokes. In some embodiments, during the act of stroking with the brush, the brush's paint load will be depleted, eventually running out, and the brush may dirty, picking up paint from the canvas, as with a real brush. Clean and fill actions may be provided to allow the user to manage the paint load between strokes for the desired stroke effect. The user interface illustrated in FIG. 2 also includes a color palette whereby a user may manually load a brush with paint if and when desired, and a "fill" user interface element (shown as a radio button) whereby a user may enable or disable an auto fill option.

As noted above, in some embodiments, in order to create a more natural mapping of tablet stylus pose to 2D brush tip deformation, a graphics application or image editing application (e.g., a natural media painting application) may use a 3D texture projection model, such as a custom projection model or one based on the existing 3D graphics literature. The application may be configured to model the tablet stylus as if it were a virtual projector with the 2D brush tip image being projected on a virtual canvas. In some embodiments, the application may be configured to compute a texture projection (i.e., an image that would appear on the canvas) based on the values of various configurable parameters of the application and/or 6DOF data collected from the tablet stylus and/or the tablet itself, and this texture projection (e.g., the resulting 2D deformation) may be the 2D stamp used to create a mark on the virtual canvas in response to the contact between the stylus and tablet. In some embodiments, this may create a more natural mapping that automatically respects the changes in tablet stylus pose in a way that feels natural to artists accustomed to pencils and felt tip pens (as compared to the mappings employed in previous digital painting applications).

Note that in some embodiments, the 2D brush tip image (e.g., a selected stamp, image, or texture) may be represented internally to the application as a square (e.g., as a grid of pixels) or as a set of pixels in another arbitrary default or configurable shape, in which some of the pixels have been "filled in" to represent a desired mark. For example, various pixels in such a grid may be assigned color or grayscale values that collectively represent a selected shape, image, or mark to be made by the brush tool. In some embodiments, the pixels values may collectively depict a real-world image (e.g., a photograph), or a portion thereof, while in other embodiments they may represent any other type of digitally encoded graphic. In the descriptions that follow, the projection of such an underlying grid of pixels (or other representation of the available stamp pixels) may sometimes be referred to as a "stamp area", and the "filled in" pixels may sometimes be referred to simply as a "stamp" or as a "mark".

Figure 3:
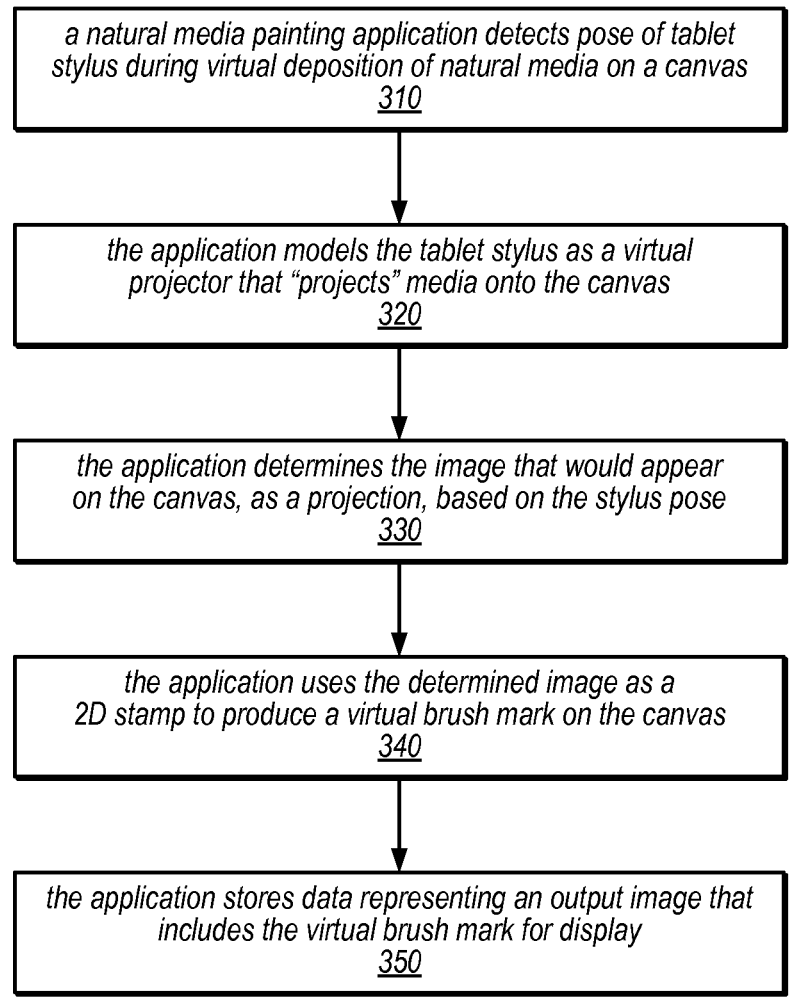
FIG. 3 is a flow diagram illustrating one embodiment of a method for creating a mark on a virtual canvas using a brush tool modeled as a projector.

One embodiment of a method for creating a mark on a virtual canvas using a brush tool modeled as a projector is illustrated in FIG. 3. The method shown in FIG. 3 may be used in conjunction with embodiments of the computer system shown in FIG. 12, among other devices. In various embodiments, some of the method elements shown may be performed concurrently, in a different order than shown, or may be omitted. Additional method elements may also be performed as desired. Any of the method elements described may be performed automatically (i.e., without user intervention). As illustrated in this example, the method may include a natural media painting application detecting the pose of tablet stylus during virtual deposition of paint or other natural media on a canvas (as in 310). As described herein, this may in some embodiments include collecting 6DOF data (or the values of different types and/or numbers of pose parameters) from the tablet stylus or the tablet itself, from which the pose can be determined. As described herein, the application may model the tablet stylus as if it were a virtual projector that "projects" the painting or drawing media (e.g., paint, graphite, or other natural media) to disburse it onto the canvas (as in 320). For example, the application may include a brush model that represents the tip of the tablet stylus as a virtual projector that distributes the media onto the canvas as if a pre-determined 2D shape, image, pattern, texture, or other type of mark were projected from the tip to the canvas. In some embodiments, the pre-determined 2D shape, image, pattern, texture, or other type of mark may be selectable and/or configurable by a user, while in other embodiments it may be a default or context-specific mark.

As illustrated in this example, the method may include the application determining the image that would appear on the canvas, as a projection, based on the stylus pose (as in 330). For example, the shape and/or extent of the mark made by the projection on the canvas (which may be a distortion of the pre-determined 2D shape, image, pattern, texture, or other type of mark) may be determined by the application based on the collected 6DOF data and/or other types or amount of pose data. As illustrated in FIG. 3, the application may use the determined image (e.g., a distorted version of the pre-determined 2D shape, image, pattern, texture, or other type of mark) as a 2D stamp to produce a virtual brush mark on the canvas (as in 340). In some embodiments, the application may store data representing an output image that includes the virtual brush mark for subsequent display (as in 350). For example, it may be stored as intermediate image data for a digital image that is being (or has been) edited and/or may be stored or displayed during (or at the conclusion of) an interactive image editing session in which a user adds one or more brush strokes to a digital image, in various embodiments.

Figure 4:
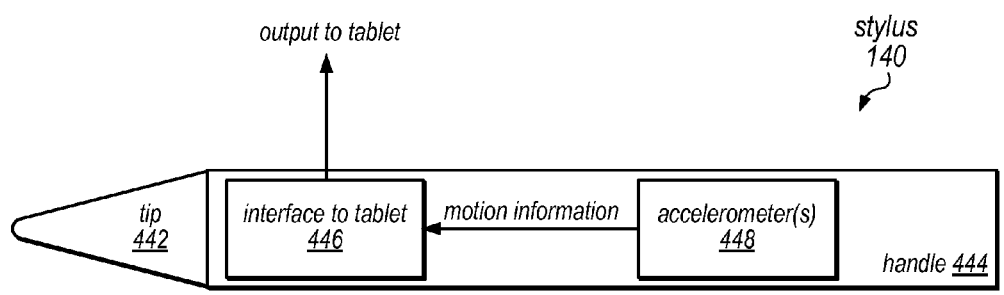
FIG. 4 illustrates various components of an example stylus, according to some embodiments.

FIG. 4 illustrates components of an example stylus 140 according to some embodiments. Stylus 140 may generally be described as having a tip 442 and a handle 444. Note that a stylus 140 may be provided with two tips instead of one as shown in FIG. 4. Stylus 140 may include one or more accelerometers 448 and/or other components for sensing movement metrics including but not limited to spatial (location), directional, and acceleration metrics. This motion information may be communicated to a tablet device, such as tablet 130 shown in FIG. 1 and FIG. 11, via an interface 446. Interface 446 may typically be a wireless interface, although wired interfaces are also possible.

In some embodiments, the natural media painting application may employ a brush model that simulates the use of a brush, such as one represented by a brush tool that is manipulated using a stylus. In such embodiments, realistic brush behavior may be simulated in the painting application. In one embodiment, the brush behavior may be simulated substantially in real-time to deposit ink or paint onto a virtual canvas. In some embodiments, a brush model may include a large set of discrete bristles. The bristles may comprise "virtual" bristles and may also be referred to as bristle representations. The simulated behavior of the brush may result in continuous strokes created by sweeping individual bristles into quadrilaterals. The brush model and brush behavior simulation may model the change of the shape of a brush tip during a stroking motion and the deposition of paint or ink resulting from the motion. In some embodiments, by computing the effect of each bristle independently of other bristles, a faithful reproduction of how a real brush deposits paint or ink and changes shape during a stroke may be achieved.

Stylus gestures that may be detected by a natural media painting application in various embodiments may include, but are not limited to: a barrel rotation (e.g., a twisting motion about the major axis of the stylus), a fanning motion (e.g., waving the stylus tip back and forth above the tablet), mashing down (e.g., pressing the stylus into the tablet with high pressure), a jerk up (e.g., a quick motion away from the tablet), a jerk down (e.g., a quick motion toward the tablet), shaking away from the tablet (e.g., holding the stylus by its end and flicking the wrist), and/or shaking toward the tablet (e.g., holding the stylus by its end and flicking the wrist in the opposite direction). At least some of the stylus gestures that may be detected may be performed using a stylus that has been augmented with one or more accelerometers, and possibly other hardware and/or software, for collecting motion data and/or other data to be used in gesture recognition.

Figure 5A:
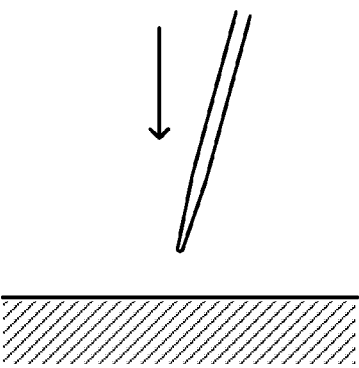
FIGS. 5A-5D illustrate various stylus poses and gestures that may be recognized by an interface module of a natural media painting application, according to various embodiments.
Figure 5B:
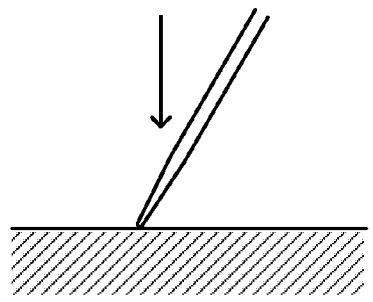
Figure 5C:
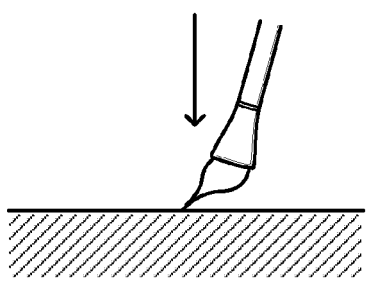
Figure 5D:
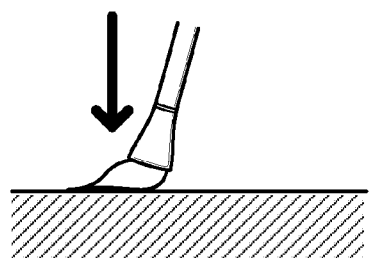
Figure 6A:
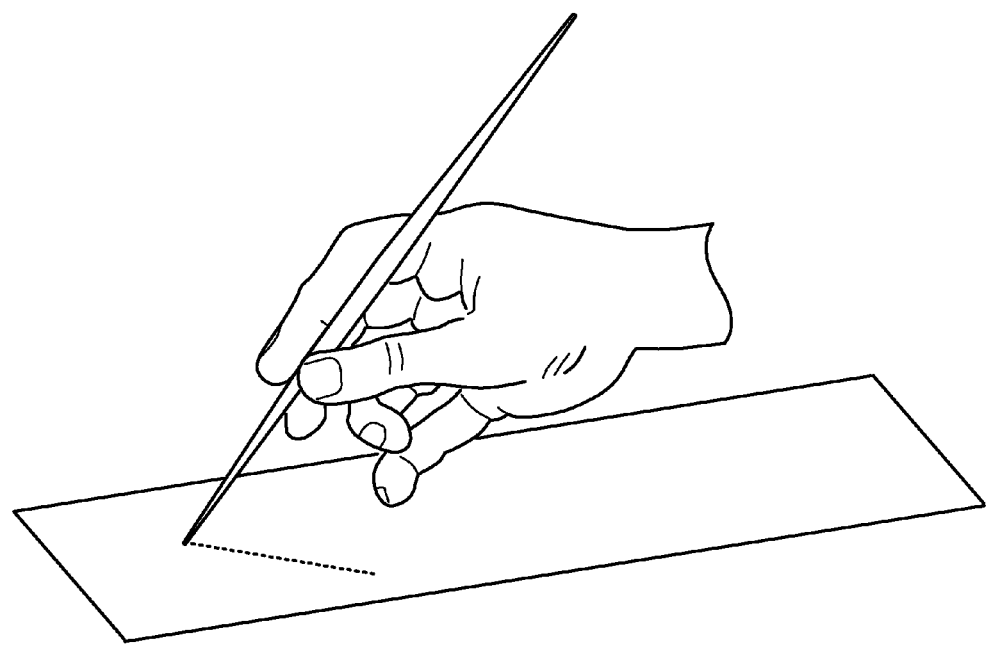
FIGS. 6A-6B illustrate examples of various stylus poses during strokes made on a tablet, according to some embodiments.
Figure 6B:
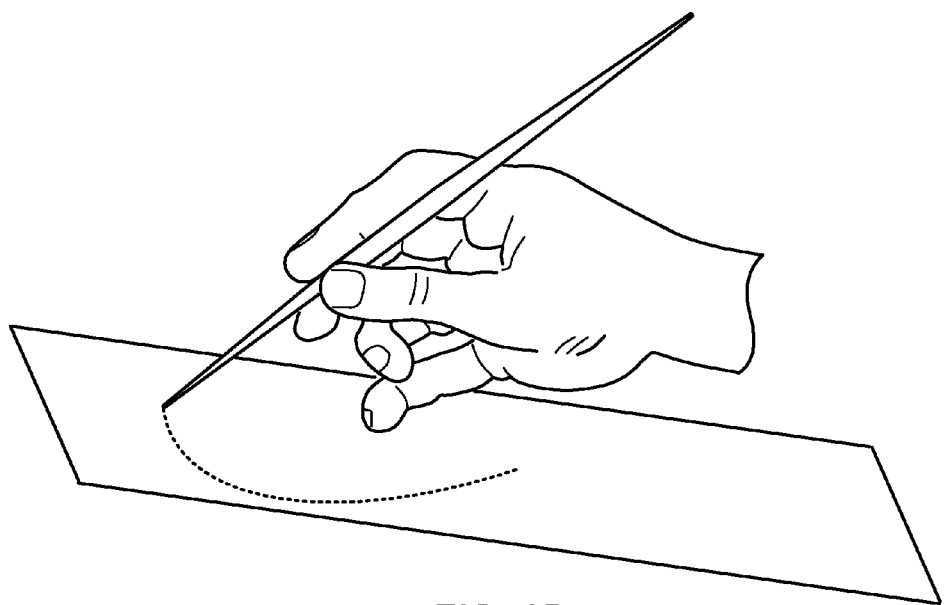

In some embodiments, a natural media painting application may detect and recognize various stylus poses, and the pressure with which a stylus touches a tablet, and these inputs may be used to create and control various painting/drawing effects, such as those described herein. Some of the stylus poses and actions that may be recognized by an interface module of a natural media painting application, such as tablet/ stylus input module 122 in FIG. 1, are illustrated in FIGS. 5A-5D, according to various embodiments. For example, FIG. 5A illustrates a stylus which is in proximity to and being moved toward a canvas and that is being held at an angle of less than 45°. FIG. 5B illustrates a stylus that is being pressed into a canvas and that is being held at an angle greater than 45°. 5C and 5D illustrate the effects of different stylus gestures on a brush model. For example, FIG. 5C illustrates the effect of a stylus gesture that corresponds to pressing a bristle brush lightly on a canvas, while FIG. 5D illustrates the effect of a stylus gesture that corresponds to mashing a bristle brush down into a canvas. In general, tablet/stylus input module 122 may be configured to recognize a wide variety of stylus poses and gestures by detecting manipulation of the stylus from an initial pose (e.g., an initial position and orientation) using six degrees of freedom (e.g., detecting movement in a given direction in three dimensions, rotation about an axis in any dimension, pitch, roll, yaw, etc.) As described herein, this 6DOF information may be augmented with information collected from an accelerometer, various proximity sensors, a touch and/or pressure sensitive tablet device, or other input mechanisms to define a stylus gesture that is mapped to an action to be taken in a natural media painting application, and the action mapped to the gesture may be dependent on a work mode and/or context in which the stylus gesture was made. Similarly, FIGS. 6A and 6B illustrate a user holding a stylus in different poses while making various painting/drawing strokes on a tablet.

As previously noted, a real pencil makes different marks based on how the pencil is held, by nature of the contact between the pencil lead cone and the canvas surface. The mark variation intuitively makes sense to artists. Thus, it may be desirable to simulate this behavior in digital painting tools. Some full 3D brush models may be able to reproduce these variations because they are represented as 3D geometry that is posed according to the stylus input. In these models, contact between the brush and canvas may be determined geometrically. However, 2D brush stamps (e.g., most brushes in digital painting applications) may need to take a different approach to simulating this variation effect, such as the approach described herein.

As noted above, in some embodiments of the graphics applications described herein (e.g., digital painting/drawing applications or other types of image editing applications or module thereof), a user may select one of a variety of 2D brush tools and/or stamp types supported in the application. For example, the brush tool may correspond to a 2D image (stamp) of a 2D shape (e.g., a circle, a soft blob, or any other shape designed to mimic natural or other media), an image, a pattern, a texture, or any other type of mark. The application may treat the 2D stamp as if it were an image being displayed by a small projector mounted at the tip of a virtual brush. For example, when a stylus representing the virtual brush is held vertically (e.g., exerting pressure on the tablet that maps to a nominal height), the resulting image that appears on the virtual canvas may be the same as the selected (and undistorted) 2D stamp. However, when the stylus is held in a different pose and/or position with respect to the tablet, the resulting image that appears on the virtual canvas may be a distorted version of the selected 2D stamp.

In some embodiments, the virtual brush projector may be controlled by directly mapping the 6DOF pose of the table stylus to the pose of the virtual brush (e.g., mapping the x and y coordinates, pressure/height, altitude, azimuth, and rotation of the stylus to the pose of the virtual brush). In such embodiments, as the user adjusts the pose of the stylus, the virtual brush moves and so does the virtual projector, resulting in a distortion in the image that forms on the canvas. For example, as the user manipulates the stylus on the tablet to draw a brush stroke on the virtual canvas with a selected brush tool, a series of 2D stamps may be imprinted on the canvas, each of which may be distorted by an amount (and with a particular effect) that is based on the respective pose of the stylus when the stamp was imprinted. To accomplish this, the application may employ a 3D geometry and perspective-correct texture mapping, as described herein.

As previously noted, in some embodiments the pressure exerted by the stylus on the tablet may not be used in computing the distortion of a 2D stamp, but may be used in other calculations (e.g., computing the size of the stamp), which may be handled by a different module of the graphics application than a module configured to simulate a virtual brush projector. In such embodiments, the virtual brush projector may be modeled as a projector with a fixed height (which may be dependent on a configurable parameter) and the application may use the tilt of the stylus (regardless of the pressure) in determining the distortion of the 2D stamp.

In some embodiments, a virtual brush projector model may be thought of as shooting beams or rays out from the tip of the stylus (as if from the tip of a pencil, a felt tip pen, or another type of natural media painting or drawing tool) to the define the boundaries of a stamp area on the virtual canvas (e.g., the corners of a square stamp area). When the stylus is tilted, these beams or rays may be redistributed (i.e., shot out at different angles) to model a distorted tip that makes a distorted shape on the canvas. In other words, the projector may be thought of as creating a 3D geometry (e.g., a pyramidal or conical beam) representing perspective projection, for which there is a point that is at the center of projection and a plane of projection. The projection of a 2D stamp by the virtual projector may cause different amounts of distortion based, at least in part, on how close the center of projection is to the plane of projection. For example, if the center of projection is very close to the plane of projection, the projection may have very high perspective and there may be a lot of distortion in the resulting 2D stamp. By imagining a line drawn from the center of projection to the corners of the plane of projection, one can see that the extent of the resulting mark may be very large (i.e., it may be spread wider than the undistorted mark). On the other hand, if the center of projection is very far from the plane of projection, the resulting mark may have less distortion due to any tilt in the stylus and may have a shape that is closer to the shape of the original stamp image.

In some embodiments, the graphics application may be configured to simulate projection perspective scenarios that are not physically possible. For example, the application may be able to simulate a scenario in which the center of projection is infinitely far from the plane of projection, which may be referred to as an orthographic projection. In this case, there may be no distortion due to any tilting of the stylus. In this example, the mark resulting from the orthographic projection of a circular stamp may be an ellipse when the stylus is tilted, but there may be no changes in the size of the mark on the sides (i.e., the mark may not be fatter or narrower on one side, as would be the case with other projection perspective scenarios). In some embodiments, the graphics application may be able to simulate another non-physical scenario, i.e., one in which the center of projection is on the other side (e.g., the "bottom" side) of the plane of projection (and which may be on the other side of the virtual canvas on which the mark is being made). This may result in an inverse distortion of the mark being made (i.e., a distortion having the opposite effect from that resulting from an equivalent stylus tilt when the stylus tip is modeled as if it were on the "top" side of the plane of projection and/or the virtual canvas).

In some embodiments, the brush projector may be set up using an OpenGL™ perspective projection matrix and an OpenGL™ modelview matrix based on the brush's pose. In such embodiments, the final matrix M may be used to convert between world coordinates and coordinates of the virtual brush tool. In other words, using the inverse matrix $M^1$, the world vertices for the vertices of the 2D stamp area (e.g., the corners of a square stamp area, in embodiments in which the stamp is represented internally by a grid of pixels) may be computed. These vertices may be projected from the brush tip to the canvas, to become the coordinates of the corners of the stamp area on the canvas, and the 2D stamp may be projected on the canvas within this stamp area.

Figure 7A:
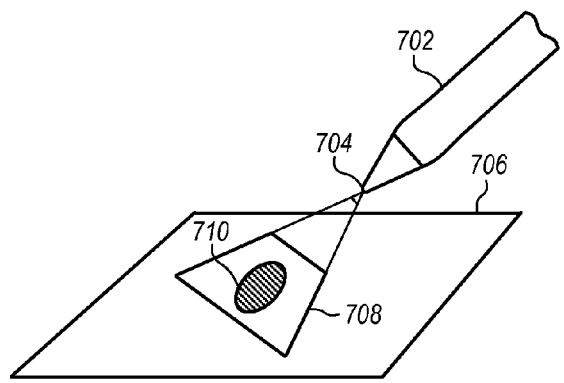
FIGS. 7A-7C illustrate a virtual brush projector distortion model, according to one embodiment.
Figure 7B:
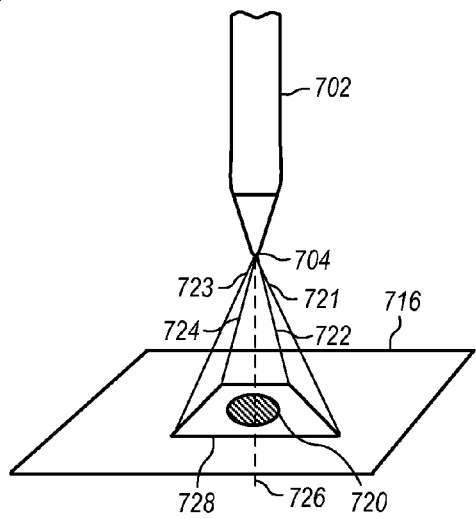
Figure 7C:
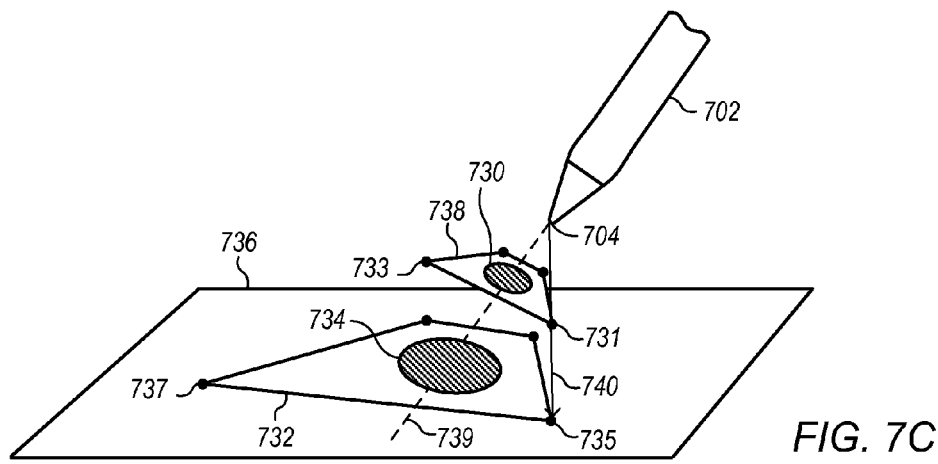

FIGS. 7A-7C illustrate a virtual brush projector distortion model, according to one embodiment. For example, FIG. 7A illustrates a mark being made in a stamp area 708 on a virtual canvas 706 by the virtual projector when the stylus 702 is held at an angle with respect to canvas 706. In this example, the selected 2D stamp (i.e., a circle) is projected with a distorted shape (shown as 710) within stamp area 708, according to the tilt of stylus 702 and the position of its tip (704), or more specifically, the distance between the center of projection (at tip 704) and the plane of projection. FIG. 7B illustrates a mark being made within a stamp area 728 by the virtual projector when the stylus 702 is held in a vertical position with respect to canvas 716 at a nominal height. In this case, the selected 2D stamp (i.e., a circle) is projected in its original shape (shown as 720). As illustrated in this example, projecting the 2D stamp includes projecting an image from the tip (704) of the stylus (702) as rays in the space bounded by (and including) rays 721-724. In this example, the point at which each of the rays 721-724 intersects canvas 716 defines a corner of the stamp area 728, and the portion of stamp area 728 that is filled in represents the mark of the 2D stamp, when projected at the angle of stylus 720 (i.e., directly vertical). In this example, dashed line 726 illustrates a ray projected from the tip (704) of stylus 702 through the center of the 2D stamp to intersect the canvas 716 when the stamp is projected onto canvas 716 to form mark 720. Since the projected mark has the same shape as the original 2D stamp, ray 726 intersects the canvas at the center of the circular shape 720.

FIG. 7C illustrates the projection of world vertices onto corresponding canvas coordinates. Specifically, FIG. 7C illustrates a mark being made in a stamp area 732 on a virtual canvas 736 by the virtual projector when the stylus 702 is held at an angle with respect to canvas 736. In this example, the selected 2D stamp (i.e., a circle) is projected with a distorted shape (shown as 734) within stamp area 732, according to the tilt of stylus 702 and the position of its tip (704), or more specifically, the distance between the center of projection (at tip 704) and the plane of projection. In this example, the stamp area in the plane of projection is illustrated as 738, and includes corners 731 and 733. These corners are projected onto canvas 736 to define corners 735 and 737 of stamp area 732, respectively. For example, FIG. 7C illustrates a ray 740 that is projected from tip 704 through corner 731 in the plane of projection to corner 735 on canvas 736 to define one of the corners of stamp area 732. The 2D stamp being projected (i.e., a circle) is illustrated in its original shape in the plane of projection (as 730) and in its distorted shape on canvas 736 (as 734). In this example, dashed line 739 illustrates a ray projected from the tip (704) of stylus 702 through the center of the 2D stamp to intersect the canvas 736 when the stamp is projected onto canvas 736 to form mark 734. In this example, ray 739 intersects the canvas at the point at which the center of the circular stamp 730 is projected onto canvas 736.

In some embodiments, perspective correct texture mapping may be applied to interpolate the 2D stamp texture across the projected quadrilateral on the canvas. To improve the appearance, trilinear mipmap sampling may also be employed, in some embodiments.

In some embodiments, in order to provide additional user control, the amount of perspective distortion to which the image is subject may be dependent on the value of a perspective distortion parameter. In some embodiments, the value of such a parameter may be user-configurable, while in others the value of such a parameter may be fixed, or may have a default value that can be overridden based on user input or other factors. In some embodiments, at the maximum value of a perspective distortion parameter, the field of view of the projection frustum may be very large. As the perspective distortion parameter value decreases, the field of view may become smaller, as the center of projection moves further away from the plane of projection. At zero distortion (i.e., if the value of the perspective distortion parameter is zero), the field of view may be zero, and the projection may become orthographic. In some embodiments, the graphics applications described herein may allow the value of such a perspective distortion parameter value to become negative, e.g., to indicate that the center of projection is on the opposite side of the plane of projection. As noted above, this may create a distortion effect that is the opposite of a distortion effect created when the perspective distortion parameter value is positive. In some ways, the perspective distortion parameter may be thought of as being similar to the cutoff angle of an airbrush projection, where a wide angle may result in a wide beam, and a shallow angle may result in a narrower beam.

In the examples illustrated in FIGS. 8A-8H, the projection of a 2D stamp from the tip of a brush tool is represented by a pyramid that comes out of the brush/stylus tip. In these examples, the center of projection is represented by the peak of the pyramid, and the distance between the center of projection and the plane of projection changes the angle in the peak of the pyramid. For example, if the center of projection is very close to the plane of projection, there may be a lot of distortion in the resulting mark on the canvas, but if the center of projection is farther away, there may be less distortion. In some embodiments, the distance between the center of projection and the plane of projection may be controlled by controlling a perspective distortion parameter, as described above. In other words, the value of this parameter may represent a "cutoff angle" for the projection, which may correspond to (e.g., may be mapped to) a particular distance between the center of projection and the plane of projection.

Figures 8A, 8B:
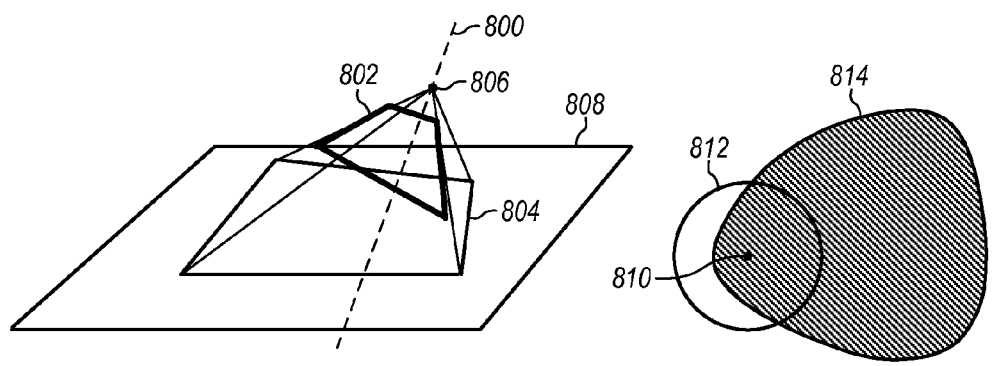

FIGS. 8A-8H illustrate variations in distortion resulting from changing projection parameters (e.g., the amount of perspective distortion), according to some embodiments. In each pair of illustrations, the large parallelogram represents a virtual canvas, the heavily lined geometry represents the stamp area in the plane of projection, and the solid dot at the peak of the pyramid represents the center of projection (which may correspond to the tip of a stylus that is modeled as a projector). As the distance between the center of projection and the plane of projection changes, the shape of the pyramid changes. In each pair of illustrations, the original 2D stamp shape is shown as a circle, and the filled mark represents the resulting distorted shape that would be made by the corresponding projector. For example, FIG. 8A illustrates a projection with heavy perspective and FIG. 8B illustrates a resulting mark that exhibits high distortion. More specifically, in the example illustrated in FIGS. 8A and 8B, the center of projection (806) is very close to the plane of projection (802), and the shape of the resulting stamp area (804) on the canvas (808) is heavily distorted from its original shape (i.e., a square). In this example, the dashed line 800 represents a ray from the center of projection (i.e., the stylus tip) through the center of the stamp and through the canvas. As illustrated in FIG. 8B, the original 2D stamp (shown as 812) is a circle, and the resulting distorted mark (shown as 814) is wider at the tip than at the base. The center of the original stamp 812 (shown also in its position within the resulting distorted mark 814) is labeled as 810.

Figures 8C, 8D:
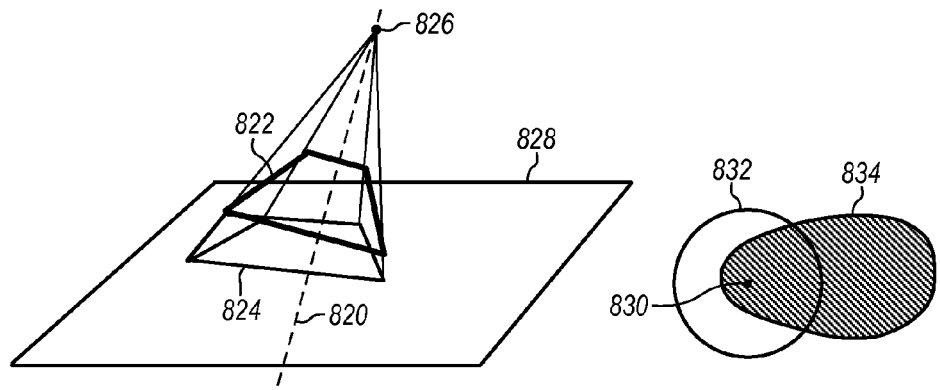

In another example, FIG. 8C illustrates a projection with low perspective and FIG. 8D illustrates a resulting mark that exhibits lower distortion than that exhibited in the previous example. More specifically, in the example illustrated in FIGS. 8C and 8D, the center of projection (826) is farther from the plane of projection (822) than in the previous example, and the shape of the resulting stamp area (824) on the canvas (828) is less distorted from its original shape (i.e., a square) than in the previous example. In this example, the dashed line 820 represents a ray from the center of projection (i.e., the stylus tip) through the center of the stamp and through the canvas. As illustrated in FIG. 8D, the original 2D stamp (shown as 832) is a circle, and the resulting distorted mark (shown as 834) is wider at the tip than at the base, but is less distorted than in the previous example. The center of the original stamp 832 (shown also in its position within the resulting distorted mark 834) is labeled as 830.

In another example, FIG. 8E illustrates a projection with zero perspective (e.g., an orthographic projection) and FIG. 8F illustrates a resulting mark (i.e., an ellipse with no additional distortion). More specifically, in the example illustrated in FIGS. 8E and 8F, the center of projection is much farther from the plane of projection (842) than in the previous examples (e.g., it may be modeled as if the center of projection is infinitely far from the plane of projection), and the shape of the resulting stamp area (844) on the canvas (848) is much less distorted from its original shape (i.e., a square) than in the previous examples (i.e., it is nearly identical to the stamp area in the plane of projection 842). In this example, the dashed line 840 represents a ray from the center of projection (i.e., the stylus tip) through the center of the stamp and through the canvas. As illustrated in FIG. 8F, the original 2D stamp (shown as 852) is a circle, and the resulting distorted mark (shown as 854) is an ellipse with no additional distortion. The center of the original stamp 852 (shown also in its position within the resulting distorted mark 854) is labeled as 850.

As previously noted, the graphics applications described herein may be able to simulate a non-physical scenario in which the center of projection is on one the opposite side of the plane of projection (e.g., by setting the value of a perspective distortion parameter to a negative number), and this may result in an inverse distortion of the mark being made (e.g., a distortion having the opposite effect from that resulting from setting the perspective distortion parameter value to a positive number of the same magnitude). In such embodiments, the application may collect position and pose information from the stylus (as before), but then invert the distortion that would have resulted if the perspective parameter value was positive. FIG. 8G illustrates a projection with such a negative perspective and FIG. 8H illustrates a resulting mark that exhibits inverse distortion. More specifically, in the example illustrated in FIGS. 8G and 8H, the center of projection (866) is on the opposite side of the canvas (868) and the plane of projection (864) than in the previous examples. In this example, the shape of the resulting stamp area (864) on the canvas (868) is distorted from its original shape (i.e., a square), according to the non-physical perspective distortion parameter value (i.e., a negative number), and the inverted effect of the collected position/pose information. In this example, the dashed line 860 represents a ray from the center of projection (i.e., the stylus tip) through the canvas and through center of the stamp (in that order). As illustrated in FIG. 8H, the original 2D stamp (shown as 872) is a circle, and the resulting distorted mark (shown as 874) is wider at the base than at the tip, which is the opposite of the distortion shown in two previous examples. The center of the original stamp 872 (shown also in its position within the resulting distorted mark 874) is labeled as 870.

Figure 9:
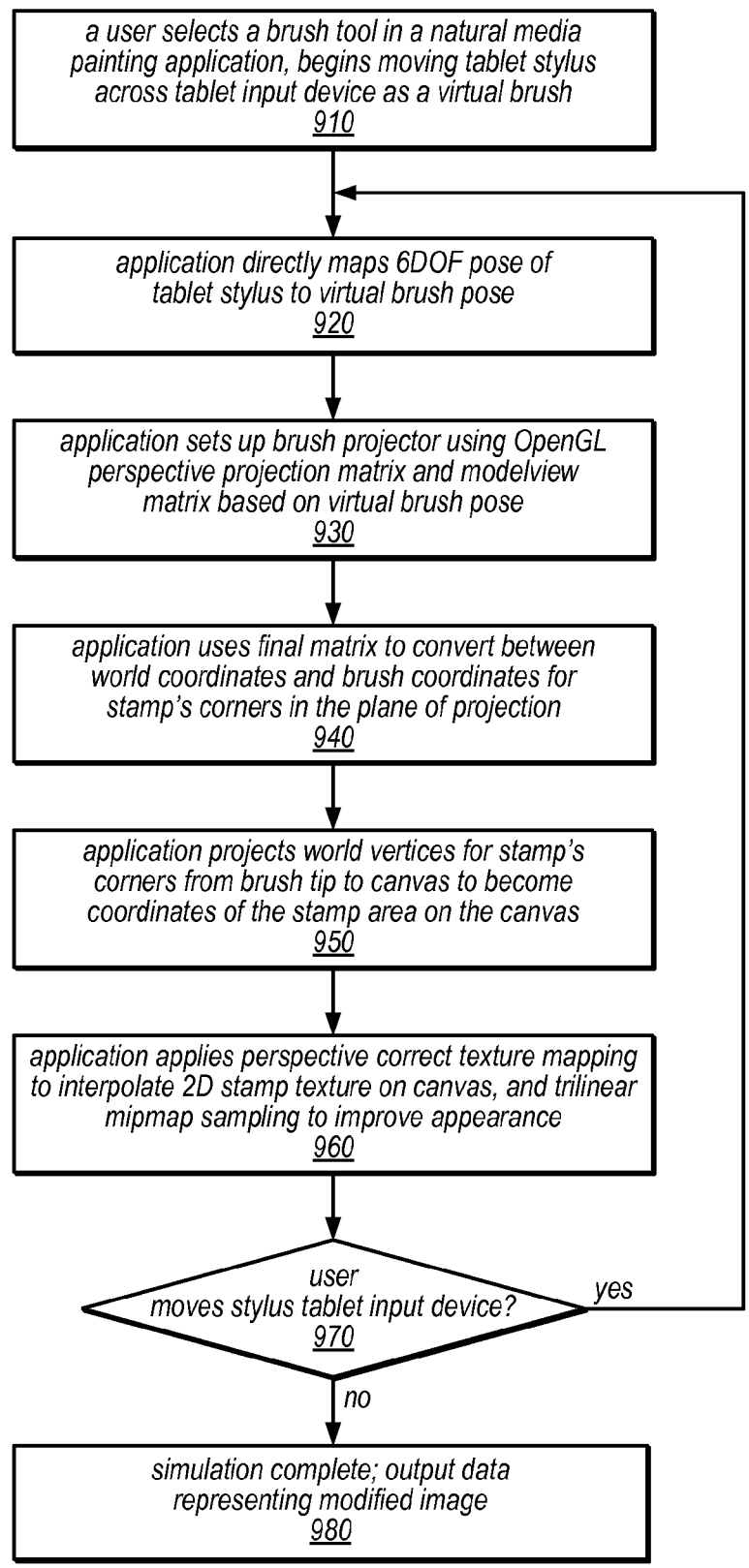
FIG. 9 is a flow diagram illustrating one embodiment of a method for creating a mark on a virtual canvas using a brush tool modeled as if a projector were in the brush tip.

FIG. 9 illustrates one embodiment of a method creating a mark on a virtual canvas using a brush tool modeled as if a projector were in the brush tip. The method shown in FIG. 9 may be used in conjunction with embodiments of the computer system shown in FIG. 12, among other devices. In various embodiments, some of the method elements shown may be performed concurrently, in a different order than shown, or may be omitted. Additional method elements may also be performed as desired. Any of the method elements described may be performed automatically (i.e., without user intervention). As illustrated in this example, the method may include a user selecting a virtual brush tool in a natural media painting application, and moving the virtual brush (by moving the stylus) across the tablet input device (as in 910). For example, the user may select a brush tool type and/or a 2D stamp type through a user interface of the natural media painting application, and the application may detect this selection. As illustrated in this example, the method may include the application directly mapping the 6DOF pose of the tablet stylus to the pose of the virtual brush (as in 920). For example, the application may collect and map the x and y coordinates of the stylus, the pressure or height of the stylus, the altitude of the stylus, the azimuth of the stylus, and/or the rotation of the stylus to the pose of the virtual brush. In some embodiments, the pressure/height parameter of the stylus may not be mapped to the pose of the virtual brush (and may not affect the distortion of the resulting mark), but may affect the size of the resulting mark.

As illustrated in this example, the method may include the application setting up a brush projector using an OpenGL™ perspective projection matrix and an OpenGL™ modelview matrix based on the virtual brush pose (as in 930). The application may then using the final matrix to convert between world coordinates and brush coordinates for the vertices of the stamp area (e.g., the corners of the stamp area), as in 940. Examples of such world coordinates are illustrated as corners 731 and 733 in FIG. 7C. As illustrated in FIG. 9, the method may include the application projecting these world vertices for the vertices of the stamp area from the brush tip to the canvas to become the coordinates of the stamp area on the canvas (as in 950). Examples of these coordinates are illustrated as the projection of corners 731 and 733 to corners 735 and 737, respectively, in FIG. 7C. As illustrated in this example, the method may include the application applying perspective correct texture mapping to interpolate the 2D stamp texture on the canvas, and may also include applying trilinear mipmap sampling to improve its appearance (as in 960).

As illustrated in this example, the method may include repeating the operations shown as elements 920-960 while the user continues to move the stylus tablet across the input device (i.e., as this movement is detected by the application). This is illustrated in FIG. 9 as the feedback from the positive exit of 970 to 920. For example, if the application detects that the position of the stylus has changed (i.e., that the x, y coordinates of the tip of the stylus have changed), but that the stylus remains in the same pose, the application may be configured to produce another virtual brush mark on the virtual canvas by projecting the same two-dimensional stamp in a different area of the canvas, where the location at which the other virtual mark is made is dependent on the new position of the stylus. On the other hand, if the application detects that the position of the stylus has changed and that the pose of the stylus has also changed, the application may be configured to determine a different 2D stamp to project onto the canvas (based on the new pose of the stylus), and to produce another virtual brush mark using the new 2D stamp on the virtual canvas dependent on the new position of the stylus. For example, to create different artistic effects during the creation of a given brush stroke, the user may change the orientation of the stylus, may change the tilt of the stylus, or may twist or rotate the stylus while moving the stylus across the tablet, and the application may be configured to project different 2D stamps along the path of the brush stroke based on the changing pose and/or position data collected from the stylus and/or tablet.

Once the user stops moving the input stylus device (e.g., once the application detects the completion of the current brush stroke or a subsequent brush stroke), the simulation may be complete, and the application may output data representing a modified image (as in 980). For example, the data may be output to storage (e.g., as data representing an intermediate or final output image), and/or may be provided to a display device.

Figure 10:
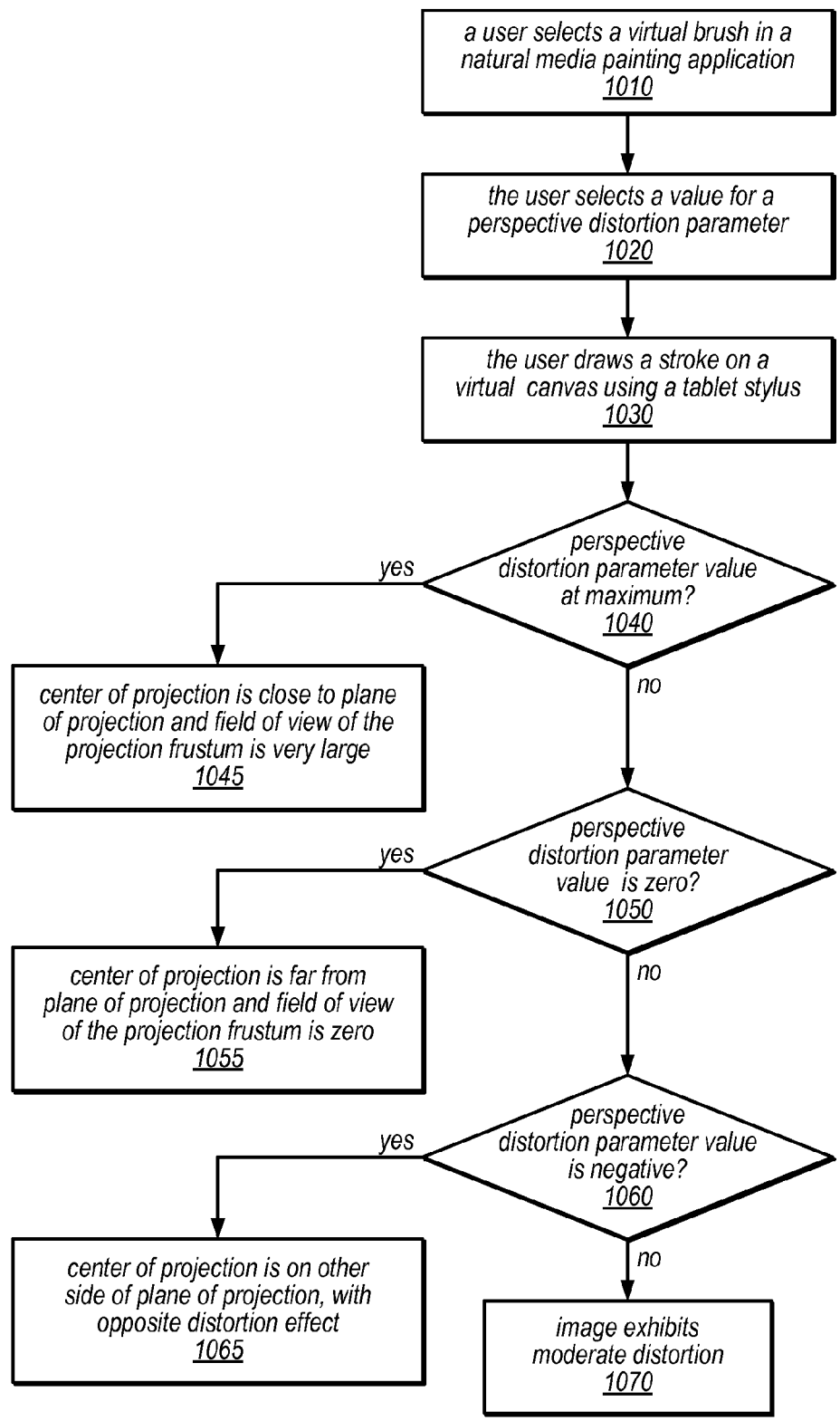
FIG. 10 is a flow diagram illustrating one embodiment of a method for incorporating user-selectable parameter values in a natural media painting application.

As described above, in some embodiments of the graphics applications described herein, the distortion of a 2D stamp resulting from the particular pose of a tablet stylus may be dependent on one or more user-configurable (or user-selectable) parameter values. One embodiment of a method for incorporating user-selectable parameter values in a natural media painting application that models a virtual brush as a media projector is illustrated by the flow diagram in FIG. 10. The method shown in FIG. 10 may be used in conjunction with embodiments of the computer system shown in FIG. 12, among other devices. In various embodiments, some of the method elements shown may be performed concurrently, in a different order than shown, or may be omitted. Additional method elements may also be performed as desired. Any of the method elements described may be performed automatically (i.e., without user intervention). As illustrated in this example, the method may include a user selecting a virtual brush tool in a natural media painting application (as in 1010), which may be detected by the application. For example, the user may select a brush tool type and/or a 2D stamp type through a user interface of the natural media painting application. The method may also include the user selecting a value for a perspective distortion parameter (as in 1020), which may control the "cutoff angle" for a perspective projection and/or the distance between the center of projection and the plane of projection (e.g., through the user interface of the application), as described herein. The method may also include the application detecting the user drawing a stroke on a virtual canvas using a tablet stylus (as in 1030).

If the perspective distortion parameter value is set at the maximum value (shown as the positive exit from 1040), the center of projection may be close to the plane of projection and the field of view of the projection frustum (and thus the distortion of the mark or marks produced by the application in response to the stroke) may be very large (as in 1045). However, if the perspective distortion parameter value is set to zero (shown as the positive exit from 1050), the center of projection may be far from the plane of projection and the field of view of the projection frustum (and thus the distortion of the mark or marks produced by the application in response to the stroke) may be zero (as in 1055). If the perspective distortion parameter value is negative (shown as the positive exit from 1060), the center of projection may be on the other side of the plane of projection. In this case, the method may include the application producing a mark or marks that exhibit the opposite distortion effect (as in 1065). Otherwise (e.g., if the distortion parameter value is between zero and the maximum value), the method may include the application producing an image (e.g., one more marks) that exhibit a moderate degree of distortion (as in 1070).

As previously noted, some existing digital painting solutions may implement explicit one-to-one mappings between tablet stylus pose parameters and distortion parameters, or may use full 3D brush models that are intersected with canvas geometry. In some embodiments, the techniques described herein may be able to reproduce more realistic results than those that are achievable using existing digital painting applications. For example, the techniques described herein may model the behavior of the virtual brush tools such that the input tablet stylus pose controls the marks made by the virtual brushes. Note that the virtual brushes to which these techniques are applied may in some embodiments include legacy 2D brush stamps that are employed in current digital painting applications.

Figure 11:
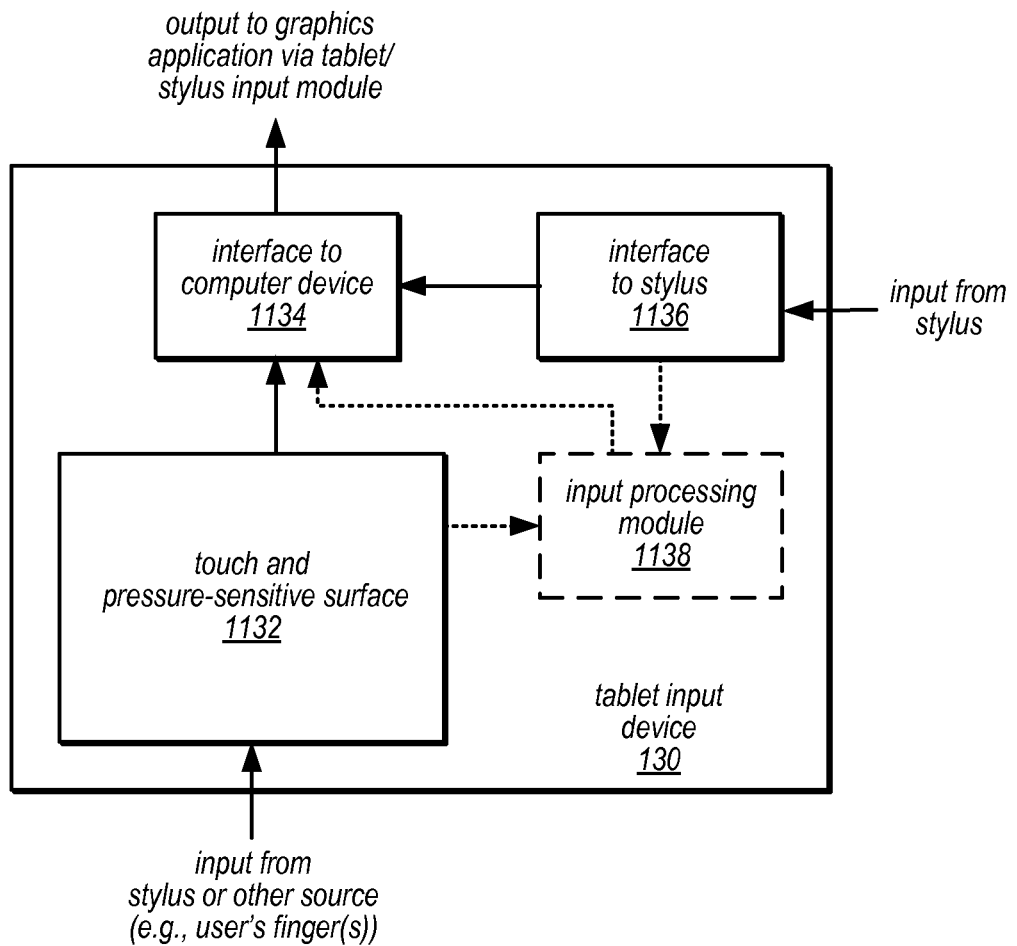
FIG. 11 illustrates various components of tablet input device, according to some embodiments.

FIG. 11 illustrates components of an example tablet input device, according to some embodiments. As illustrated in this example, tablet 130 may include a touch and pressure-sensitive surface 1132 that may be configured to detect contact with tip 442 of stylus 140, and/or contact with another object such as the user's fingertip or knuckle. Surface 1132 may also be configured to detect motion on the surface, for example detecting the dragging of tip 442 of stylus 140 across the surface. Surface 1132 may also be configured to detect the amount of pressure applied to the surface, e.g., by stylus 140, another object, or a user touch. Tablet 130 may also include an interface to stylus 1136 that is configured to detect the position of, and motion of, stylus 140 in relation to tablet 130, for example by receiving input from stylus 140 via a wireless interface, or alternatively via one or more motion detectors integrated in or coupled to tablet 130 that are configured to track the motion and position of stylus 140. In some embodiments, tablet 130 and/or stylus 140 may include a camera, through which input about the position and/or motion of stylus 140 may be collected (not shown), or such a camera may included as an additional component of the system separate from tablet 130 and stylus 140. In some embodiments, tablet 130 may also include an input processing module 1138 configured to process input received via interface to stylus 1136 and/or surface 1132.

Input processing module 1138 may also include an interface to computer device 1134. Interface 1134 may be a wired or wireless interface. Interface 1134 may be configured to communicate information collected from interface 1136 and/or surface 1132 to a computer device such as computer device 100 of FIG. 1. A graphics application on the computer device, such as graphics application 120 of FIG. 1, may interpret the information to detect various gestures and to perform various painting actions in response to the detected gestures for creating or editing the content of images, as described herein. In some embodiments, input processing module 1138 may be configured to perform at least some of the functionality of detecting and/or recognizing various gestures. Thus, in some embodiments, tablet 130 may be configured to detect/recognize gestures and communicate the gestures to a graphics application via interface 1134. The graphics application may then perform the appropriate painting actions in response to the gestures.

Some embodiments may include a means for detecting poses and gestures made using a stylus, a tablet type input device, and/or a combination of a stylus and a tablet type input device. For example, a tablet/stylus input module may present an interface through which various poses or gestures representing actions to be taken or painting effects to be applied in a natural media painting application (e.g., mode changes and/or painting operations) may be detected (e.g., using collected motion information, pressure data, etc.) and recognized, and may generate and store data representing the detected poses or gestures for use in various image editing operations in the natural media painting application, as described herein. The tablet/stylus input module may in some embodiments be implemented by a non-transitory, computer-readable storage medium and one or more processors (e.g., CPUs and/or GPUs) of a computing apparatus. The computer-readable storage medium may store program instructions executable by the one or more processors to cause the computing apparatus to perform presenting an interface through which various poses or gestures may be detected and recognized, detecting and recognizing those poses or gestures, and generating and storing data representing those poses or gestures for subsequent use in the natural media painting application, as described herein. Other embodiments of the tablet/stylus input module may be at least partially implemented by hardware circuitry and/or firmware stored, for example, in a non-volatile memory.

Some embodiments may include a means for mapping detected poses and/or gestures made using a stylus and/or tablet type input device to various functions of a natural media painting application. For example, in some embodiments, a pose/gesture mapping module may receive input specifying various poses or gestures that have been detected, may determine actions to be taken in a natural media painting application (e.g., image editing operations to be performed using a brush tool in the application, or painting/drawing effects to be applied in the application) in response to that input, and may generate and store data representing the actions to be taken or the effects to be applied in the natural media painting application, as described herein. In other embodiments, the pose/gesture mapping module may receive input specifying various pose parameter values, may determine a perspective projection for a 2D stamp based on that input, and may generate and/or store data representing a mark that corresponds to a distorted version of the 2D stamp as if it were projected from the brush tool tip, as described herein. The pose/gesture mapping module may in some embodiments be implemented by a non-transitory, computer-readable storage medium and one or more processors (e.g., CPUs and/or GPUs) of a computing apparatus. In some embodiments, the computer-readable storage medium may store program instructions executable by the one or more processors to cause the computing apparatus to perform receiving input specifying various stylus poses or gestures that have been detected, determining actions to be taken or effects to be applied in a natural media painting application in response to that input, and generating and storing data representing the actions to be taken or the effects to be applied in the natural media painting application, as described herein. In other embodiments, the computer-readable storage medium may store program instructions executable by the one or more processors to cause the computing apparatus to perform receiving input specifying various pose parameter values, determining a perspective projection for a 2D stamp based on that input, and generating and/or storing data representing a mark that corresponds to a distorted version of the 2D stamp as if it were projected from the brush tool tip, as described herein. Still other embodiments of the pose/gesture mapping module may be at least partially implemented by hardware circuitry and/or firmware stored, for example, in a non-volatile memory.

Some embodiments may include a means for simulating the behavior of various types of brushes in a natural media painting application. For example, a painting simulation module (which may include a brush model), may receive input specifying various painting actions to be performed in a natural media painting application (e.g., image editing operations to be performed using a brush tool in the application) in response to tablet and/or stylus input, and may generate and store data representing an image that has been modified by the various image editing operations in the natural media painting application, as described herein. The painting simulation module may in some embodiments be implemented by a non-transitory, computer-readable storage medium and one or more processors (e.g., CPUs and/or GPUs) of a computing apparatus. The computer-readable storage medium may store program instructions executable by the one or more processors to cause the computing apparatus to perform receiving input specifying various painting actions to be performed in a natural media painting application (e.g., image editing operations to be performed using a brush tool in the application) in response to tablet and/or stylus input, and generating and storing data representing an image that has been modified by the various image editing operations in the natural media painting application, as described herein. Other embodiments of the painting simulation module may be at least partially implemented by hardware circuitry and/or firmware stored, for example, in a non-volatile memory.

EXAMPLE COMPUTER SYSTEM

Figure 12:
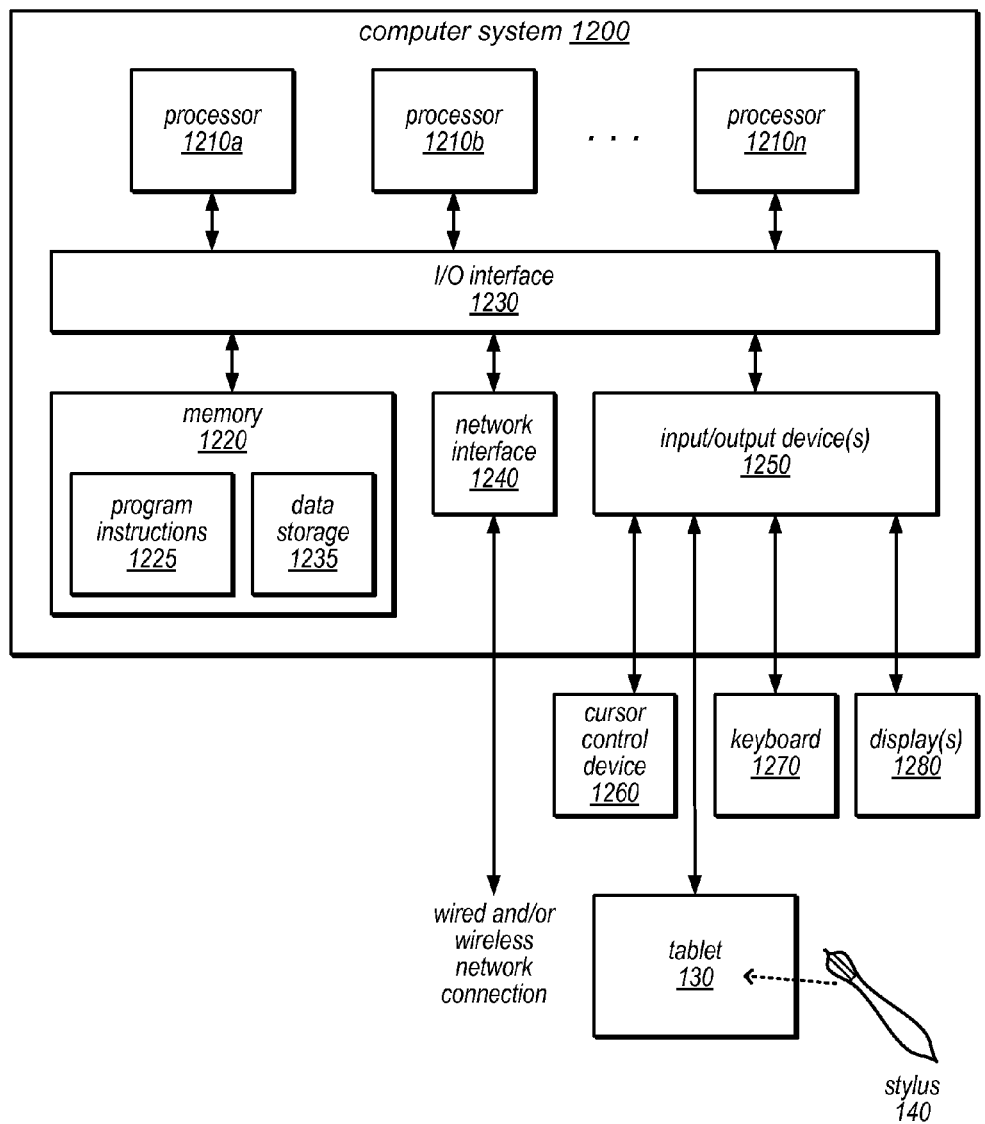
FIG. 12 is a block diagram illustrating an example computer system that may be used to implement the techniques described herein, according to some embodiments.

The methods illustrated and described herein may be executed on one or more computer systems, which may interact with other devices, according to various embodiments. One such computer system is illustrated in FIG. 12. In the illustrated embodiment, computer system 1200 includes one or more processors 1210 coupled to a system memory 1220 via an input/output (I/O) interface 1230. Computer system 1200 further includes a network interface 1240 coupled to I/O interface 1230, and one or more input/output devices 1250, such as cursor control device 1260, keyboard 1270, audio device 1290, and display(s) 1280. Input/output devices 1250 include a tablet 130 and stylus 140 for enabling natural media painting using a realistic brush and tablet stylus gestures as described herein. In some embodiments, it is contemplated that embodiments may be implemented using a single instance of computer system 1200, while in other embodiments multiple such systems, or multiple nodes making up computer system 1200, may be configured to host different portions or instances of embodiments. For example, in one embodiment some elements may be implemented via one or more nodes of computer system 1200 that are distinct from those nodes implementing other elements.

In various embodiments, computer system 1200 may be a uniprocessor system including one processor 1210, or a multiprocessor system including several processors 1210 (e.g., two, four, eight, or another suitable number). Processors 1210 may be any suitable processor capable of executing instructions. For example, in various embodiments, processors 1210 may be general-purpose or embedded processors implementing any of a variety of instruction set architectures (ISAs), such as the x86, PowerPC, SPARC, or MIPS ISAs, or any other suitable ISA. In multiprocessor systems, each of processors 1210 may commonly, but not necessarily, implement the same ISA.

In some embodiments, at least one processor 1210 may be a graphics processing unit. A graphics processing unit or GPU may be considered a dedicated graphics-rendering device for a personal computer, workstation, game console or other computer system. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the methods as illustrated and described in the accompanying description may be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies, and others.

System memory 1220 may be configured to store program instructions and/or data accessible by processor 1210. In various embodiments, system memory 1220 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those for methods as illustrated and described in the accompanying description, are shown stored within system memory 1220 as program instructions 1225 and data storage 1235, respectively. In other embodiments, program instructions and/or data may be received, sent or stored upon different types of computer-accessible media or on similar media separate from system memory 1220 or computer system 1200. Generally speaking, a computer-accessible medium may include storage media or memory media such as magnetic or optical media, e.g., disk or CD/DVD-ROM coupled to computer system 1200 via I/O interface 1230. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1240.

In one embodiment, I/O interface 1230 may be configured to coordinate I/O traffic between processor 1210, system memory 1220, and any peripheral devices in the device, including network interface 1240 or other peripheral interfaces, such as input/output devices 1250, including tablet 130 and stylus 140. In some embodiments, I/O interface 1230 may perform any necessary protocol, timing or other data transformations to convert data signals from one component (e.g., system memory 1220) into a format suitable for use by another component (e.g., processor 1210). In some embodiments, I/O interface 1230 may include support for devices attached through various types of peripheral buses, such as a variant of the Peripheral Component Interconnect (PCI) bus standard or the Universal Serial Bus (USB) standard, for example. In some embodiments, the function of I/O interface 1230 may be split into two or more separate components, such as a north bridge and a south bridge, for example. In addition, in some embodiments some or all of the functionality of I/O interface 1230, such as an interface to system memory 1220, may be incorporated directly into processor 1210.

Network interface 1240 may be configured to allow data to be exchanged between computer system 1200 and other devices attached to a network, such as other computer systems, or between nodes of computer system 1200. In various embodiments, network interface 1240 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1250 may, in some embodiments, include one or more display terminals, keyboards, keypads, touchpads, scanning devices, voice or optical recognition devices, tablets and stylus, or any other devices suitable for entering or retrieving data by one or more computer system 1200. Multiple input/output devices 1250 may be present in computer system 1200 or may be distributed on various nodes of computer system 1200. In some embodiments, similar input/output devices may be separate from computer system 1200 and may interact with one or more nodes of computer system 1200 through a wired or wireless connection, such as over network interface 1240.

As shown in FIG. 12, memory 1220 may include program instructions 1225, configured to implement embodiments of methods as illustrated and described in the accompanying description, and data storage 1235, comprising various data accessible by program instructions 1225. In one embodiment, program instructions 1225 may include software elements of methods as illustrated and described in the accompanying description, including a tablet/stylus input module, painting simulation module, brush model, and/or pose/gesture mapping module. Data storage 1235 may include data that may be used by these and other modules in some embodiments. For example, it may store collected pose parameter values, mappings between various poses and painting/drawing actions, world coordinate values, projected coordinate values, values of various default and/or user-configurable parameters (including, but not limited to those representing brush type selections, stamp type selections, a perspective distortion parameter, or any other default or user-configurable parameters described herein). In other embodiments, other or different software elements and/or data may be included in memory 1220.

Those skilled in the art will appreciate that computer system 1200 is merely illustrative and is not intended to limit the scope of methods as illustrated and described in the accompanying description. In particular, the computer system and devices may include any combination of hardware or software that can perform the indicated functions, including computers, network devices, internet appliances, PDAs, wireless phones, pagers, etc. Computer system 1200 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via intercomputer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1200 may be transmitted to computer system 1200 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the systems and methods described herein may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the figures and described herein represent examples of embodiments of methods. The methods may be implemented in software, hardware, or a combination thereof. The order of method may be changed, and various elements may be added, reordered, combined, omitted, modified, etc. Various modifications and changes may be made as would be obvious to a person skilled in the art having the benefit of this disclosure. It is intended that the disclosure embrace all such modifications and changes and, accordingly, the above description to be regarded in an illustrative rather than a restrictive sense.

What is claimed is:

1. A method, comprising:
    performing, by a computer:
        determining a pose of a stylus that is in contact with or in proximity of a tablet device;
        modeling the stylus as a virtual projector that projects painting or drawing media onto a virtual canvas;
        determining an image that would appear on the virtual canvas as projected by the virtual projector, said determining an image being dependent on the determined pose, said determining an image comprising projecting vertices in a plane of projection from a tip of the stylus to vertices comprising the determined image on the virtual canvas;
        producing a virtual brush mark on the virtual canvas using the determined image as a two-dimensional stamp; and
        storing data representing an image that includes the virtual brush mark.

2. The method of claim 1, wherein said determining an Image comprises interpolating a pre-determined stamp texture for perspective dependent on the determined pose.

3. The method of claim 1, wherein said determining an Image IS further dependent on a value of a perspective distortion parameter.

4. The method of claim 1, wherein said determining an image comprises determining the boundaries of an area of the virtual canvas onto which the virtual projector projects painting or drawing media dependent on the determined pose.

5. The method of claim 1, wherein said determining the pose comprises collecting information about the orientation of the stylus with respect to the tablet device.

6. The method of claim 1, further comprising:
    detecting that the position of the stylus has changed, but that the stylus remains in the determined pose; and
    in response to said detecting, producing another virtual brush mark on the virtual canvas using the determined image as a two-dimensional stamp, wherein the area of the virtual canvas on which the other virtual brush mark is made is dependent on the changed position.

7. The method of claim 1, further comprising:
    detecting a change in the pose of the stylus; and
    in response to said detecting, repeating said determining an image and producing a virtual brush mark on the virtual canvas dependent on the detected change in the pose of the stylus.

8. The method of claim 7, wherein the detected change in the pose of the stylus comprises one or more of: a change in the orientation of the stylus, a tilting of the stylus, a twisting of the stylus, or a rotation of the stylus.

9. A system, comprising:
    at least one processor; and
    a memory coupled to the at least one processor, the memory storing program instructions that when executed by the at least one processor to cause the at least one processor to perform:
        determining a pose of a stylus that is in contact with or in proximity of a tablet device;
        modeling the stylus as a virtual projector that projects painting or drawing media onto a virtual canvas;
        determining an image that would appear on the virtual canvas as projected by the virtual projector, said determining an image being dependent on the determined pose, said determining an image comprising projecting vertices in a plane of projection from a tip of the stylus to vertices comprising the determined image on the virtual canvas;
        producing a virtual brush mark on the virtual canvas using the determined image as a two-dimensional stamp; and
        storing data representing an image that includes the virtual brush mark.

10. The system of claim 9, wherein said determining an image comprises interpolating a pre-determined stamp texture for perspective dependent on the determined pose.

11. The system of claim 9, wherein said determining an image is further dependent on a value of a perspective distortion parameter.

12. The system of claim 9, wherein said determining an image comprises determining the boundaries of an area of the virtual canvas onto which the virtual projector projects painting or drawing media dependent on the determined pose.

13. The system of claim 9, wherein when executed by the at least one processor the program instructions further cause the at least one processor to perform:
    detecting that the position of the stylus has changed, but that the stylus remains in the determined pose; and
    in response to said detecting, producing another virtual brush mark on the virtual canvas using the determined image as a two-dimensional stamp, wherein the area of the virtual canvas on which the other virtual brush mark is made is dependent on the changed position.

14. The system of claim 9, wherein when executed by the at least one processor the program instructions further cause the at least one processor to perform:

- detecting a change in the pose of the stylus; and
- in response to said detecting, repeating said determining an image and producing a virtual brush mark on the virtual canvas dependent on the detected change in the pose of the stylus.

15. A non-transitory, computer-readable storage medium storing program instructions that when executed on one or more computers cause the one or more computers to perform:

- determining a pose of a stylus that is in contact with or in proximity of a tablet device;
- modeling the stylus as a virtual projector that projects painting or drawing media onto a virtual canvas;
- determining an image that would appear on the virtual canvas as projected by the virtual projector, said determining an image being dependent on the determined pose, said determining an image comprising projecting vertices in a plane of projection from a tip of the stylus to vertices comprising the determined image on the virtual canvas;
- producing a virtual brush mark on the virtual canvas using the determined image as a two-dimensional stamp; and
- storing data representing an image that includes the virtual brush mark.

16. The non-transitory, computer-readable storage medium of claim 15, wherein said determining an image comprises interpolating a pre-determined stamp texture for perspective dependent on the determined pose.

17. The non-transitory, computer-readable storage medium of claim 15, wherein said determining an image is further dependent on a value of a perspective distortion parameter.

18. The non-transitory, computer-readable storage medium of claim 15, wherein said determining an image comprises determining the boundaries of an area of the virtual canvas onto which the virtual projector projects painting or drawing media dependent on the determined pose.

19. The non-transitory, computer-readable storage medium of claim 15, wherein when executed on the one or more computers the program instructions further cause the one or more computers to perform:

- detecting that the position of the stylus has changed, but that the stylus remains in the determined pose; and
- in response to said detecting, producing another virtual brush mark on the virtual canvas using the determined image as a two-dimensional stamp, wherein the area of the virtual canvas on which the other virtual brush mark is made is dependent on the changed position.

20. The non-transitory, computer-readable storage medium of claim 15, wherein when executed on the one or more computers the program instructions further cause the one or more computers to perform:

- detecting a change in the pose of the stylus; and
- in response to said detecting, repeating said determining an image and producing a virtual brush mark on the virtual canvas dependent on the detected change in the pose of the stylus.

* * * * *